United States Patent
Sen et al.

(10) Patent No.: US 12,518,369 B2
(45) Date of Patent: Jan. 6, 2026

(54) SYSTEMS AND METHODS FOR PAINT DEFECT DETECTION USING MACHINE LEARNING

(71) Applicant: ABB Schweiz AG, Baden (CH)

(72) Inventors: Nevroz Sen, Los Gatos, CA (US);
WenLong Li, Baden (CH);
Amber-FengQin Zhu, Shanghai (CN);
Kun Chang, Shanghai (CN)

(73) Assignee: ABB Schweiz AG, Baden (CH)

( * ) Notice: Subject to any disclaimer, the term of this patent is extended or adjusted under 35 U.S.C. 154(b) by 300 days.

(21) Appl. No.: 18/263,009

(22) PCT Filed: Jan. 26, 2021

(86) PCT No.: PCT/IB2021/050595
§ 371 (c)(1),
(2) Date: Jul. 26, 2023

(87) PCT Pub. No.: WO2022/162417
PCT Pub. Date: Aug. 4, 2022

(65) Prior Publication Data
US 2024/0087105 A1    Mar. 14, 2024

(51) Int. Cl.
*G06T 7/00* (2017.01)

(52) U.S. Cl.
CPC .. *G06T 7/0004* (2013.01); *G06T 2207/20081* (2013.01); *G06T 2207/20084* (2013.01); *G06T 2207/30156* (2013.01)

(58) Field of Classification Search
CPC ......... G06T 7/0004; G06T 2207/20081; G06T 2207/20084; G06T 2207/30156;
(Continued)

(56) References Cited

U.S. PATENT DOCUMENTS

| | | | |
|---|---|---|---|
| 9,996,765 B2* | 6/2018 | Yajko | G06T 7/0004 |
| 11,676,264 B2* | 6/2023 | Plihal | G06T 7/001 |
| | | | 382/149 |

(Continued)

FOREIGN PATENT DOCUMENTS

| | | |
|---|---|---|
| JP | 2006-267022 A | 10/2006 |
| JP | 5182833 B1 | 4/2013 |

(Continued)

OTHER PUBLICATIONS

Zhong, P. "The Application of Machine Vision in Defect Detection Systems" Journal of Electronic Research and Application, 2025, vol. 9, Issue 2 http://ojs.bbwpublisher.com/index.php/JERA ISSN Online: 2208-3510 pp. 1-6 (Year: 2025).*

(Continued)

*Primary Examiner* — Mia M Thomas
(74) *Attorney, Agent, or Firm* — Fitch, Even, Tabin & Flannery LLP

(57) ABSTRACT

A method for detecting paint defects on objects is provided. The method comprises: projecting a plurality of patterns on a surface of an object at a plurality of different pattern characteristics; capturing a plurality of images of the object based on projecting the plurality of patterns; inputting the plurality of images of the object into a machine learning model to determine whether the surface of the object includes one or more paint defects; and based on determining, an image, of the plurality of images, includes a paint defect, causing display of the image with the paint defect.

17 Claims, 19 Drawing Sheets

(58) Field of Classification Search
CPC .. G06T 2207/10152; G06T 2207/30136; G06T 7/0008

See application file for complete search history.

(56) References Cited

U.S. PATENT DOCUMENTS

| | | | | |
|---|---|---|---|---|
| 11,724,404 | B2* | 8/2023 | Telleria | B25J 9/1697 |
| | | | | 700/160 |
| 12,140,501 | B1* | 11/2024 | Hever | G01N 21/8806 |
| 12,367,571 | B1* | 7/2025 | Brighton | G06V 10/70 |
| 2003/0139836 | A1* | 7/2003 | Matthews | G01N 21/8806 |
| | | | | 700/109 |
| 2010/0092069 | A1* | 4/2010 | Asada | G01N 21/8851 |
| | | | | 382/141 |
| 2017/0356856 | A1* | 12/2017 | Matsumoto | G06T 7/0004 |
| 2018/0038805 | A1* | 2/2018 | Heikkilä | G06T 7/75 |
| 2018/0293721 | A1* | 10/2018 | Gupta | G06N 3/045 |
| 2018/0330493 | A1* | 11/2018 | Milligan | G06N 3/088 |
| 2019/0070707 | A1* | 3/2019 | Kamada | B24B 37/22 |
| 2019/0287237 | A1* | 9/2019 | de Bonfim Gripp | G06T 7/64 |
| 2020/0104993 | A1* | 4/2020 | Hong | G01N 21/8422 |
| 2020/0269439 | A1 | 8/2020 | Telleria et al. | |
| 2020/0355627 | A1* | 11/2020 | Wen | G01N 21/95607 |
| 2020/0380655 | A1* | 12/2020 | Chu | G06F 18/231 |
| 2021/0027445 | A1* | 1/2021 | Plihal | G06T 7/001 |
| 2021/0247324 | A1* | 8/2021 | Naruse | G06N 3/045 |
| 2021/0325313 | A1* | 10/2021 | Kasavala | G01B 11/2513 |
| 2021/0394218 | A1* | 12/2021 | Gagne | B05B 7/066 |
| 2022/0126319 | A1* | 4/2022 | Richardson | G05B 19/41875 |
| 2022/0164866 | A1* | 5/2022 | Hauk | H04N 5/222 |
| 2022/0219182 | A1* | 7/2022 | Winter | B05B 12/006 |
| 2022/0366558 | A1* | 11/2022 | Bufi | G01N 35/0099 |
| 2022/0374720 | A1* | 11/2022 | Qu | G06N 3/063 |
| 2023/0080612 | A1* | 3/2023 | Yoon | G06T 7/0004 |
| | | | | 382/141 |
| 2023/0333028 | A1* | 10/2023 | Elhossini | G01N 21/956 |
| 2023/0334653 | A1* | 10/2023 | Elhossini | G06T 7/001 |

FOREIGN PATENT DOCUMENTS

| | | |
|---|---|---|
| JP | 2016-156654 A | 9/2016 |
| JP | 2017-101977 A | 6/2017 |
| JP | 2019-082333 A | 5/2019 |
| JP | 2020-524349 A | 8/2020 |
| JP | 2020-526821 A | 8/2020 |
| WO | WO 2019/194255 A1 | 10/2019 |

OTHER PUBLICATIONS

Li et al., "End-to-end single-shot composite fringe projection profilometry based on deep learning," *Fourth International Conference on Photonics and Optical Engineering, Proceedings of SPIE*, vol. 11761, 9 pp. (Jan. 15, 2021).

European Patent Office, International Search Report in International Patent Application No. PCT/IB2021/050595, 4 pp. (Oct. 19, 2021).

European Patent Office, Written Opinion in International Patent Application No. PCT/IB2021/050595, 5 pp. (Oct. 19, 2021).

Japan Patent Office, Office Action in Japanese Patent Application No. 2023-544738, 9 pp. (May 21, 2024).

\* cited by examiner

400

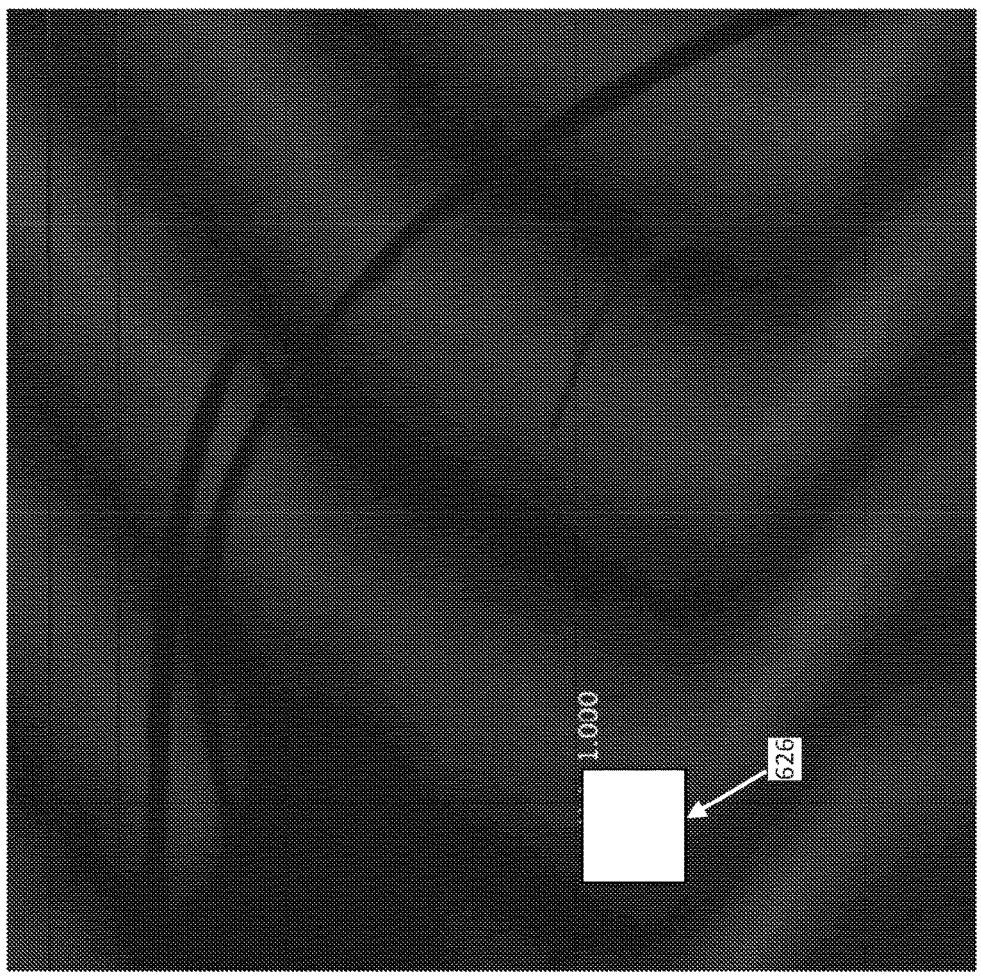

622

SYSTEMS AND METHODS FOR PAINT DEFECT DETECTION USING MACHINE LEARNING

FIELD

The present disclosure relates to object detection using machine learning/artificial intelligence algorithms and, more particularly, to systems and methods for detecting paint defects using deep learning.

BACKGROUND

Traditionally, the quality of a paint job is evaluated by experts, which is a labor intensive process and requires multiple inspection lines for high volume yield. For example, the manufacturing process of a vehicle may include a painting process. However, there may be defects that are introduced or that may occur during this process. For instance, very small dust and/or other particles may be on the surface of the vehicle and when painted over, these particles may cause visible defects. Further, a scratch may occur on the surface of the vehicle after paint has been applied. Therefore, experts may be used to evaluate whether the vehicle has these defects. However, not only is this a time intense process, the judgment made by an expert is subjective and can contain biases (e.g., one expert may determine that there is a defect and another may determine there is not a defect). Therefore, the classification results might be inconsistent. Accordingly, there remains a technical need to provide an automated process for detecting defects on the surface of vehicles.

SUMMARY

A first aspect of the present disclosure provides a method for detecting paint defects on objects. The method comprises: projecting a plurality of patterns on a surface of an object at a plurality of different pattern characteristics; capturing a plurality of images of the object based on projecting the plurality of patterns; inputting the plurality of images of the object into a machine learning model to determine whether the surface of the object includes one or more paint defects; and based on determining, an image, of the plurality of images, includes a paint defect, causing display of the image with the paint defect.

According to an implementation of the first aspect, projecting the plurality of patterns comprises: projecting, at a first instance in time, a first pattern with a first pattern characteristic on the object; and projecting, at a second instance in time, a second pattern with a second pattern characteristic on the object, wherein the first pattern characteristic is different from the second pattern characteristic.

According to an implementation of the first aspect, capturing the plurality of images comprises: capturing, at the first instance in time, one or more first images based on projecting the first pattern; capturing, at the second instance in time, one or more second images based on projecting the second pattern, and wherein inputting the plurality of images into the machine learning model comprises inputting the one or more first images and the one or more second images into the machine learning model.

According to an implementation of the first aspect, the first pattern is a horizontal pattern and the second pattern is a vertical pattern.

According to an implementation of the first aspect, the first pattern is associated with a first frequency value and the second pattern is associated with a second frequency value that is different from the first frequency value.

According to an implementation of the first aspect, the method further comprises: receiving the machine learning model from a back-end server, wherein the back-end server trains the machine learning model based on captured images of paint defects on surfaces of one or more vehicles.

According to an implementation of the first aspect, the method further comprises: receiving a generic object detection machine learning model from a back-end server; and training the generic object detection machine learning model to generate the machine learning model based on captured images of paint defects.

According to an implementation of the first aspect, the machine learning model comprises Mask Region-based Convolutional Neural Networks (Mask-RCNN).

According to an implementation of the first aspect, the machine learning model comprises a residual neural network (ResNet). Further, inputting the plurality of images of the object into the machine learning model to determine whether the surface of the object includes the one or more paint defects comprises: inputting the plurality of images into the ResNet to extract a plurality of features from the plurality of images; and determining whether the plurality of features show the one or more paint defects on the surface of the object.

According to an implementation of the first aspect, the machine learning model further comprises a feature pyramid network (FPN) and a region proposal network (RPN). The determining whether the plurality of features show the one or more paint defects on the surface of the object comprises: using the FPN and RPN to generate two outputs for the plurality of features, wherein a first output, of the two outputs, indicates whether a feature, from the plurality of features, is a paint defect, and wherein a second output, of the two outputs, is a location identifier for the feature.

A second aspect of the present disclosure provides a system for detecting paint defects on objects. The system comprises a pattern projection device configured to project a plurality of patterns on a surface of an object at a plurality of different pattern characteristics; an image capturing device configured to capture a plurality of images of the object based on projecting the plurality of patterns; and a control system configured to: input the plurality of images of the object into a machine learning model to determine whether the surface of the object includes one or more paint defects; and based on determining, an image, of the plurality of images, includes a paint defect, display the image with the paint defect.

According to an implementation of the second aspect, the pattern projection device is configured to project the plurality of patterns by: projecting, at a first instance in time, a first pattern with a first pattern characteristic on the object; and projecting, at a second instance in time, a second pattern with a second pattern characteristic on the object, wherein the first pattern characteristic is different from the second pattern characteristic.

According to an implementation of the second aspect, the image capturing device is configured to capture the plurality of images by: capturing, at the first instance in time, one or more first images based on projecting the first pattern; capturing, at the second instance in time, one or more second images based on projecting the second pattern, and wherein the control system inputs the plurality of images into the machine learning model by inputting the one or more first images and the one or more second images into the machine learning model.

According to an implementation of the second aspect, the first pattern is a horizontal pattern and the second pattern is a vertical pattern.

According to an implementation of the second aspect, the first pattern is associated with a first frequency value and the second pattern is associated with a second frequency value that is different from the first frequency value.

According to an implementation of the second aspect, the control system is further configured to: receive the machine learning model from a back-end server, wherein the back-end server trains the machine learning model based on captured images of paint defects on surfaces of one or more vehicles.

According to an implementation of the second aspect, the control system is further configured to: receive a generic object detection machine learning model from a back-end server; and train the generic object detection machine learning model to generate the machine learning model based on captured images of paint defects.

According to an implementation of the second aspect, the machine learning model comprises Mask Region-based Convolutional Neural Networks (Mask-RCNN).

A third aspect of the present disclosure provides a non-transitory computer-readable medium having processor-executable instructions stored thereon. The processor-executable instructions, when executed by one or more controllers, facilitate: projecting a plurality of patterns on a surface of an object at a plurality of different pattern characteristics; capturing a plurality of images of the object based on projecting the plurality of patterns; inputting the plurality of images of the object into a machine learning model to determine whether the surface of the object includes one or more paint defects; and based on determining, an image, of the plurality of images, includes a paint defect, causing display of the image with the paint defect.

According to an implementation of the third aspect, projecting the plurality of patterns comprises: projecting, at a first instance in time, a first pattern with a first pattern characteristic on the object; and projecting, at a second instance in time, a second pattern with a second pattern characteristic on the object, wherein the first pattern characteristic is different from the second pattern characteristic.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following:

FIGS. 6A-6L depict exemplary captured images with paint defects detected using machine learning according to one or more embodiments of the present disclosure.

DETAILED DESCRIPTION

Figure 1:
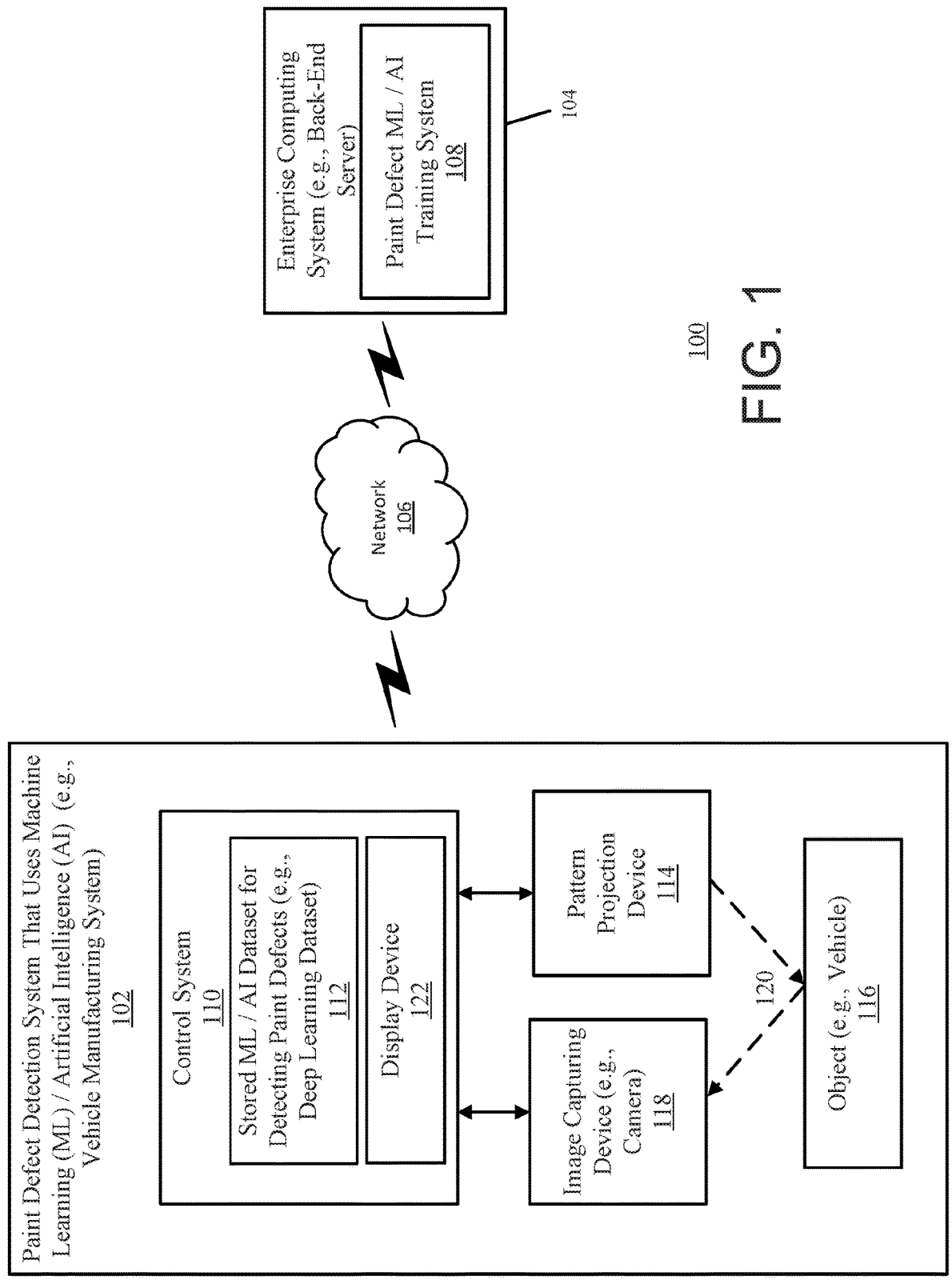
FIG. 1 illustrates a simplified block diagram depicting an environment for using machine learning to detect paint defects according to one or more embodiments of the present disclosure.

Recently, there has been a significant interest to develop automated defect detection systems for paint quality inspection of vehicles. However, one fundamental difficulty, among others, of the automated system is the acquisition of decent quality of images, which typically cannot be achieved by traditional methods (e.g., making proper lighting conditions is a challenging process because of the high reflection coefficient of the car/test surface). Therefore, different principles may be deployed in image acquisition and the analysis system. Phase Measuring Deflectometry (PMD) is among such principles where the topographical information of a specular surface is obtained by analyzing the reflections of a structured light source. This is done by first displaying a sinusoidal fringe pattern on a liquid crystal display (LCD) screen, which is located at a certain distance from the test surface, and then capturing the reflected pattern with the help of a camera. However, an automated system that solely uses PMD might still not be accurate enough to detect paint defects in an industrial setting. For example, projecting one pattern on an object may show several types of defects, but it may miss many other types of defects. These inaccuracies may be exacerbated even more if object detection machine learning algorithms are used.

To put it another way, automated quality inspection of automotive paint process has recently taken significant interest and such systems have been productized and may be seen in the market. The current approaches for defect identification may be roughly categorized based on the data set and the corresponding method that is being applied. More explicitly, the images are either acquired using standard cameras or using different principles, such as using structured light sources, or fringe patterns. It has already been known that image acquisition with standard cameras with traditional approaches in manufacturing environments is not feasible as projecting one pattern on an object may miss many of the paint defects.

Therefore, machine learning based object detection models have found limited applications. However, the present disclosure describes using images acquired with the reflection of fringe patterns from the surface of the object, which provides the possibility of observing the surface under a variety of conditions. Thus, a machine learning algorithm trained under these different fringe patterns is able to have a superior performance to identify and localize different defects.

In other words, the present disclosure provides a machine learning based approach that significantly differs from the widely used traditional algorithms. For instance, traditional algorithms depend upon using several phase shifted generated patterns in order to compute the irregularities, via, for instance, considering the discontinuities in the derivative of the phase-map, which is followed by applying several filters, such as size/noise filter, surface curvature filter and edge filter, to remove the false alarms. These traditional algorithms would still need an additional algorithm to further classify the defects and furthermore, for the performance of these methods one typically needs a large number of samples from every scanned surface.

However, in the present disclosure, a deep learning based object identification method and system for the identification of defects is described, which uses phase shifted patterns for the image acquisition. In other words, as described herein, a method and system for improving the quality of acquired images using a structured light source (e.g., by using different patterns and/or acquisition methods), and then applying machine learning based object detection model to the improved acquired images for the detection of paint defects in the vehicle painting process. To put it another way, the present disclosure identifies, localizes, and classifies paint defects on acquired images, which are captured by reflecting light from the painted surface of the vehicle bodies. This is able to be achieved at certain speed and cost improvements. The cost may be associated with either the amount of data required to build a learning model or with the image acquisition setup. The images may be acquired using structured light sources.

Exemplary aspects of detecting paint defects using machine learning, according to the present disclosure, are further elucidated below in connection with exemplary embodiments, as depicted in the figures. The exemplary embodiments illustrate some implementations of the present disclosure and are not intended to limit the scope of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

FIG. 1 illustrates a simplified block diagram depicting an environment 100 for using machine learning to detect paint defects according to one or more embodiments of the present disclosure.

Referring to FIG. 1, the environment 100 includes a paint defect detection system that uses machine learning (ML)/ artificial intelligence (AI) 102, an enterprise computing system 104, and a network 106. Although the entities within environment 100 may be described below and/or depicted in the FIGs. as being singular entities, it will be appreciated that the entities and functionalities discussed herein may be implemented by and/or include one or more entities.

The entities within the environment 100 such as the paint defect detection system 102 and the enterprise computing system 104 may be in communication with other systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100. Additionally, and/or alternatively, the paint defect detection system 102 and the enterprise computing system 104 may be in communication with each other without using the network 106. For instance, the paint defect detection system 102 may use one or more communication protocols such as WI-FI or BLUETOOTH to communicate with directly with the enterprise computing system 104.

The enterprise computing system 104 is a computing system that is associated with the enterprise organization. In some instances, the enterprise computing system 104 is a back-end server for the enterprise organization. The enterprise organization may be any type of corporation, company, organization, institution, or the like that is formed to pursue entrepreneurial endeavors such as by selling goods and/or by providing services.

The enterprise computing system 104 includes one or more computing devices, computing platforms, systems, servers, and/or other apparatuses capable of performing tasks, functions, and/or other actions for the enterprise organization. For example, as shown, the enterprise computing system 104 includes a paint defect ML/AI training system 108. The training system 108 trains ML and/or AI models, datasets, and/or algorithms to detect paint defects on objects. For example, the training system 108 may obtain a generic object detection ML/AI model or dataset (e.g., a deep learning model or dataset) and train this model or dataset for detecting paint defects in captured images. The paint defects may be any kind of defects that can occur or form on the surface of a painted object. For example, the paint defect may be a particle defect, an off-color defect, and/or a scratch defect. A scratch defect may be a scratch in the paint that may occur after the paint has been applied to the object. A particle defect may be a particle such as a dust particle that is on the surface of the object when the paint is being applied to the object, which may cause the paint to be applied unevenly across the surface of the object. In some instances, the training system 108 may use captured images of paint defects on vehicles to train the ML/AI model or dataset. In other words, the ML/AI model or dataset may be trained to detect paint defects in vehicles. After training the ML/AI model or dataset, the enterprise computing system provides the trained ML/AI model or dataset to the paint defect detection system 102.

In some variations, the enterprise computing system 104 may be implemented using one or more computing platforms, devices, servers, and/or apparatuses. In other variations, the enterprise computing system 104 may be implemented as engines, software functions, and/or applications. In other words, the functionalities of the enterprise computing system 104 may be implemented as software instructions stored in storage (e.g., memory) and executed by one or more processors.

The paint defect detection system 102 includes a control system 110, a pattern projection device 114, an image capturing device 118, and an object with a painted surface 116. The control system 110 includes the stored ML/AI dataset for detecting paint defects 112 (e.g., a deep learning dataset) and a display device 122. For instance, after receiving the trained ML/AI model or dataset from the enterprise computing system 104, the control system 110 may store the trained ML/AI dataset for detecting paint defects (e.g., the deep learning dataset 112) in memory.

The control system 110 communicates with the pattern projection device 114 and the image capturing device 118 to detect paint defects on an object 116. The object 116 may be any type of object and paint may be applied to the surface of the object 116. In some instances, the object 116 is a vehicle and the system 102 is a vehicle manufacturing system. For instance, during the manufacturing process, the vehicle may be painted a certain color. The control system 110 may detect whether there are defects on the painted surface of the vehicle.

Figure 5A:
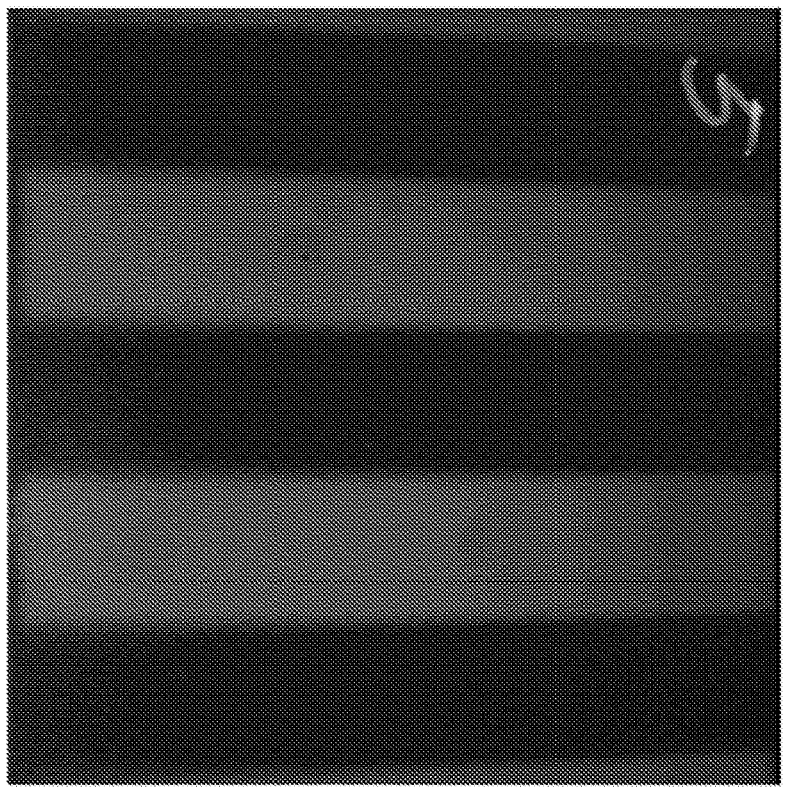
FIGS. 5A and 5B depict exemplary patterns projected onto a surface of an object according to one or more embodiments of the present disclosure.
Figure 5A:
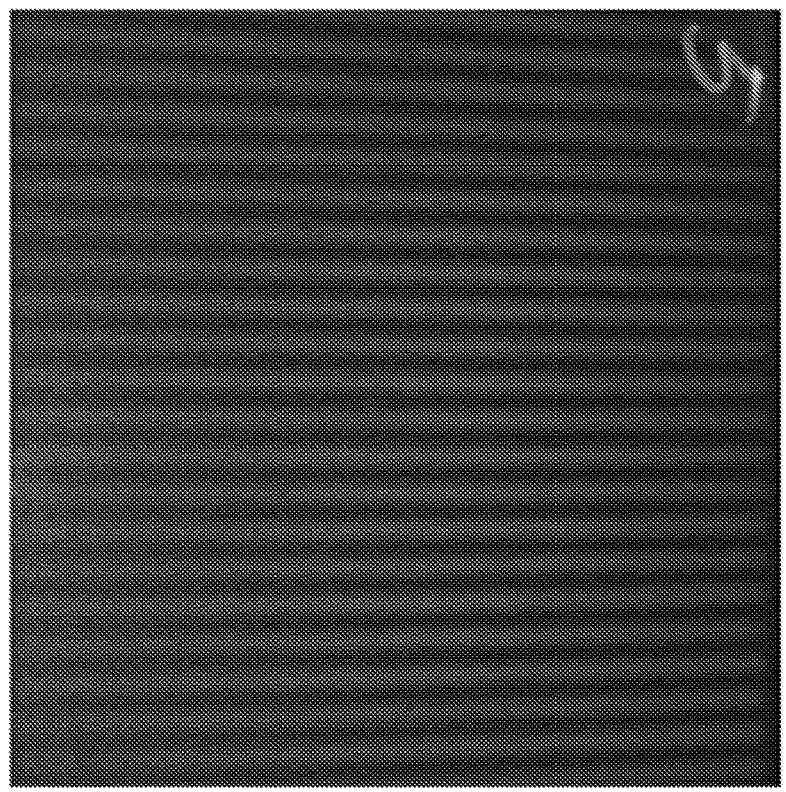
Figure 5B:
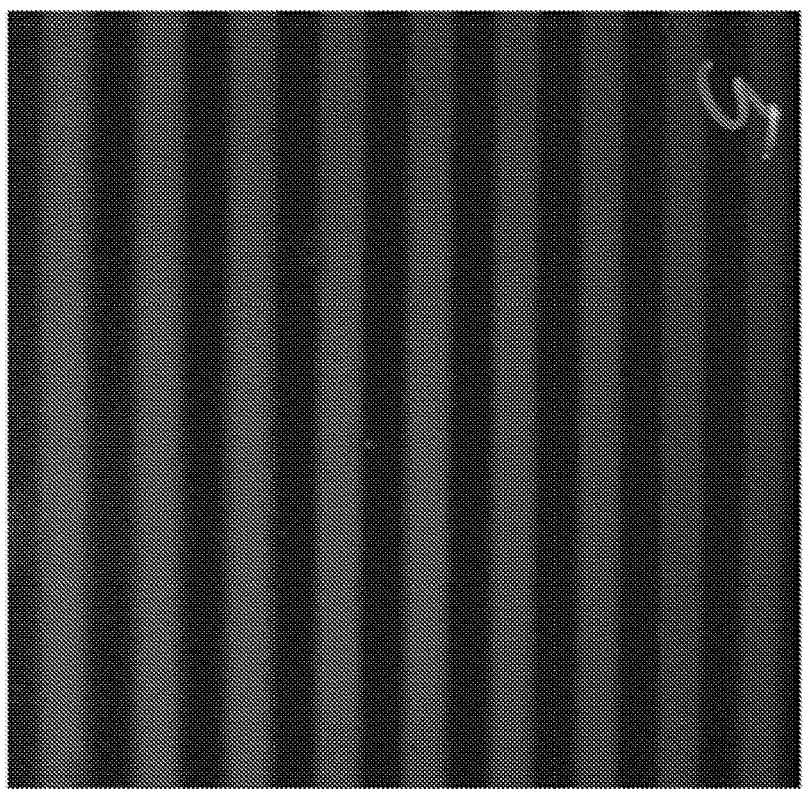
Figure 5B:
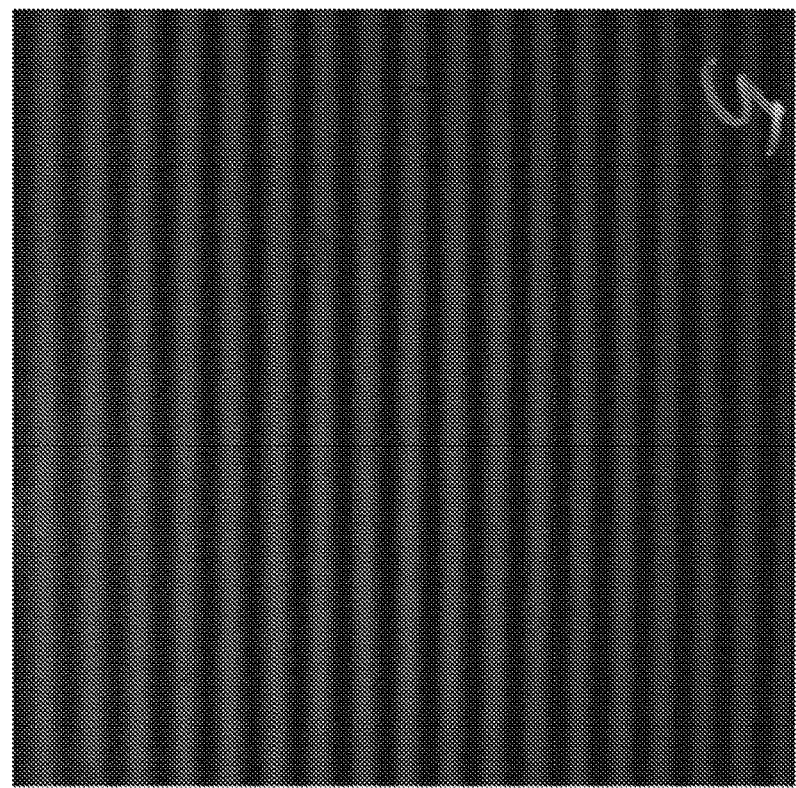

The pattern projection device 114 projects a plurality of patterns on the surface of the object 116 in order for the control system 110 to detect whether there are one or more paint defects on the object 116. The pattern projection device 114 may be any type of projection or projector device that is capable of generating or projecting patterns such as fringe patterns on an object 116. FIGS. 5A and 5B depict exemplary patterns projected onto a surface of an object 116 according to one or more embodiments of the present disclosure. The fringe patterns 502-508 have different pattern characteristics. For example, referring to FIG. 5A, the patterns 502 and 504 that are projected onto the object 116 by the pattern projection device 114 are vertical fringe patterns. The projected pattern 502 has a different frequency from the pattern 504. Referring to FIG. 5B, patterns 506 and 508 are horizontal patterns with different frequencies. In other words, each of the projected patterns on the object 116 may have different pattern characteristics (e.g., patterns 502-508). Pattern characteristics include, but are not limited to, being a vertical pattern, a horizontal pattern, a diagonal pattern, having a frequency associated with the pattern, having a phase-shift associated with the pattern, being sequential projection patterns (multi-shots), being continuously varying patterns (single shots), including stripe indexing for the patterns (single shot), including grid indexing for the patterns (single shot), a hybrid or a combination methods described above, and/or additional types of projection characteristics.

Figure 2A:
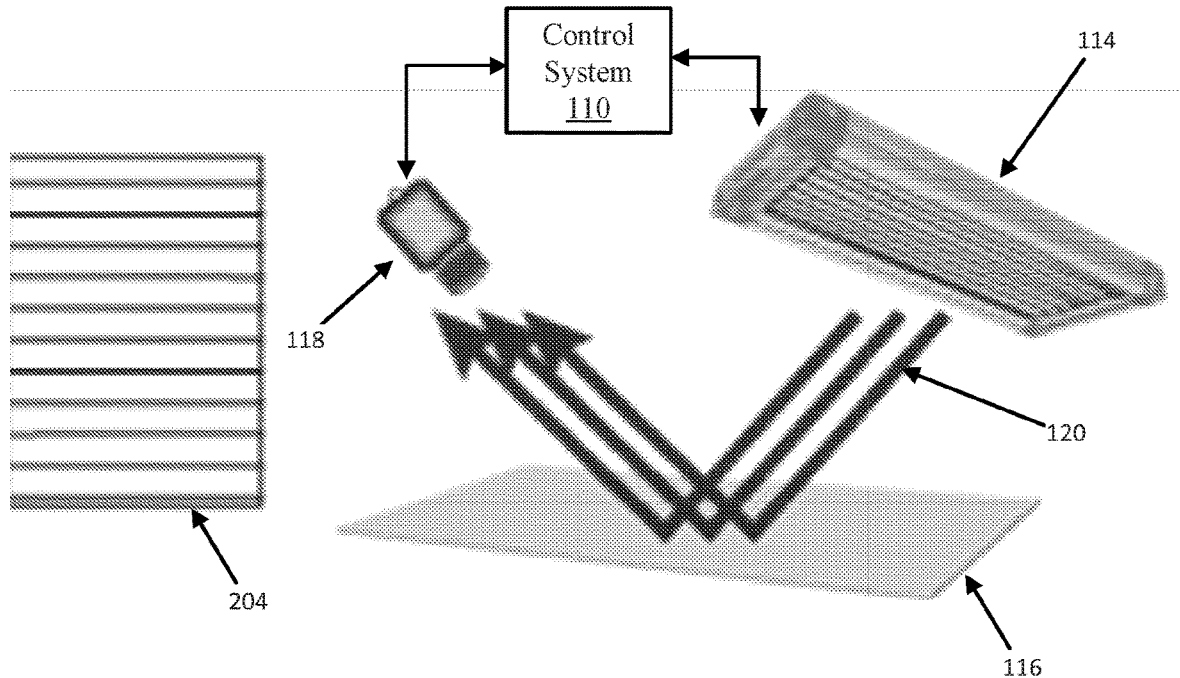
FIGS. 2A, 2B, and 2C illustrate using a projection device and an image capturing device to detect paint defects as well as a model of an acquisition device according to one or more embodiments of the present disclosure.
Figure 2B:
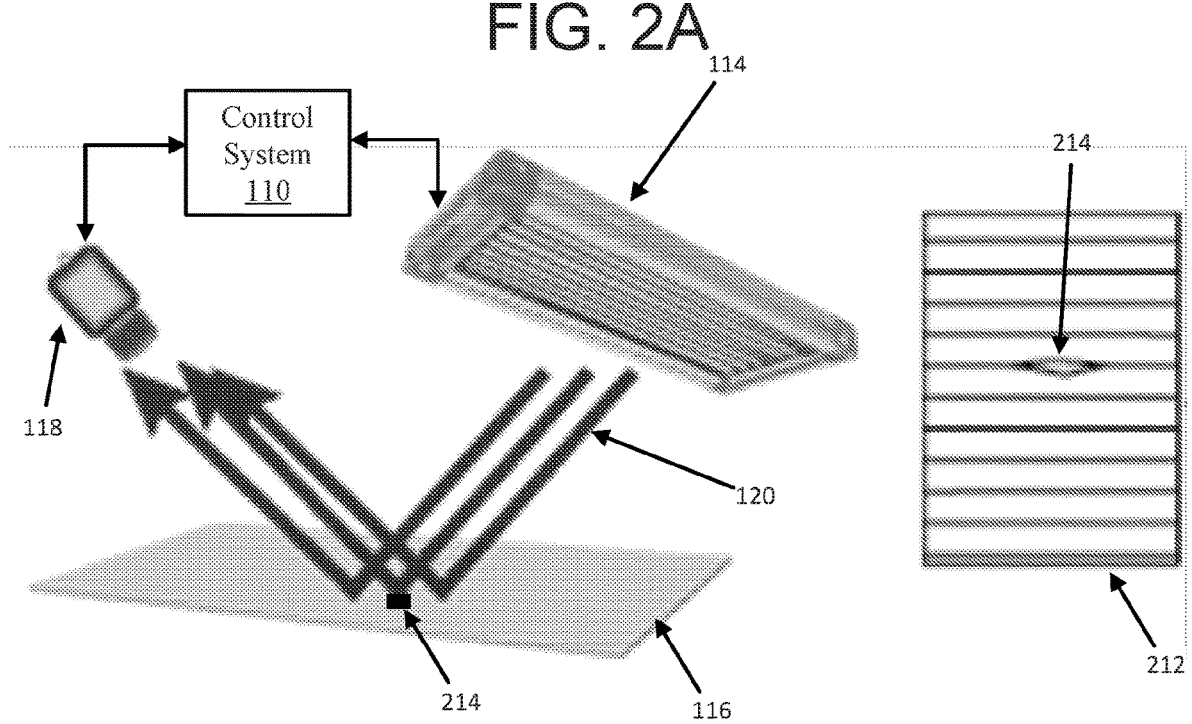

Returning back to FIG. 1, the image capturing device (e.g., a camera) 118 may capture images of the projected patterns. The image capturing device may be any type of device that is capable of capturing images and/or recording videos. For example, the pattern projection device 114 projects the projected pattern 120 (e.g., the dotted line) onto the surface of the object 116. The projected pattern 120 is reflected by the surface of the object 116 and is directed towards the image capturing device 118. The image capturing device 118 captures one or more images of the projected pattern 120. The pattern projection device 114 may project multiple patterns with different pattern characteristics onto the object 116 and the image capturing device 118 may capture images of the projected patterns with their different characteristics. The image capturing device 118 provides the captured images to the control system 110. FIGS. 2A and 2B will describe this in more detail.

In particular, FIGS. 2A and 2B illustrate using a projection device, an image capturing device, and a control system to detect paint defects according to one or more embodiments of the present disclosure. Referring to FIG. 2A, the control system 110 is in communication with the pattern projection device 114 and the image capturing device 118. Based one or more instructions from the control system 110, the pattern projection device 114 projects a pattern 120 onto the surface of the object 116. The multiple lines indicate that this pattern is a fringe pattern (e.g., a pattern with alternating light and dark sections that are set at a certain frequency). The surface of the object 116 has been painted and the pattern 120 is reflected from the surface to the image capturing device 118. The image capturing device 118 captures an image of this pattern 120 on the object 116 and provides the image back to the control system 110. The captured image is shown as 204, which includes alternating light sections and dark sections. The control system 110 may use ML/AI datasets to determine whether the object 116 has a paint defect. In FIG. 2A, there is not a paint defect on the object 116.

Referring to FIG. 2B, the same process as FIG. 2A is used to capture the images. However, in FIG. 2B, the control system 110 detects that the object 116 has a paint defect 214. As such, the captured image 212 shows this paint defect 214. This will be explained in further detail below.

Furthermore, as mentioned above, merely projecting one pattern onto the object 116 may show several types of defects, but in some instances, it may miss many other types of defects. Accordingly, referring to FIGS. 2A and 2B, after projecting the first pattern 120 and obtaining the first captured images 204 and 212, the pattern projection device 114 projects a second pattern that is different from the first pattern onto the object 116. This second pattern, as described above, may have a different pattern characteristic from the first pattern. For instance, the first pattern is shown as a horizontal pattern and the second pattern may be a vertical pattern. The control system 110 may input images of the first and second patterns into the ML/AI datasets to determine whether the object 116 has a paint defect (e.g., defect 214).

Figure 2C:
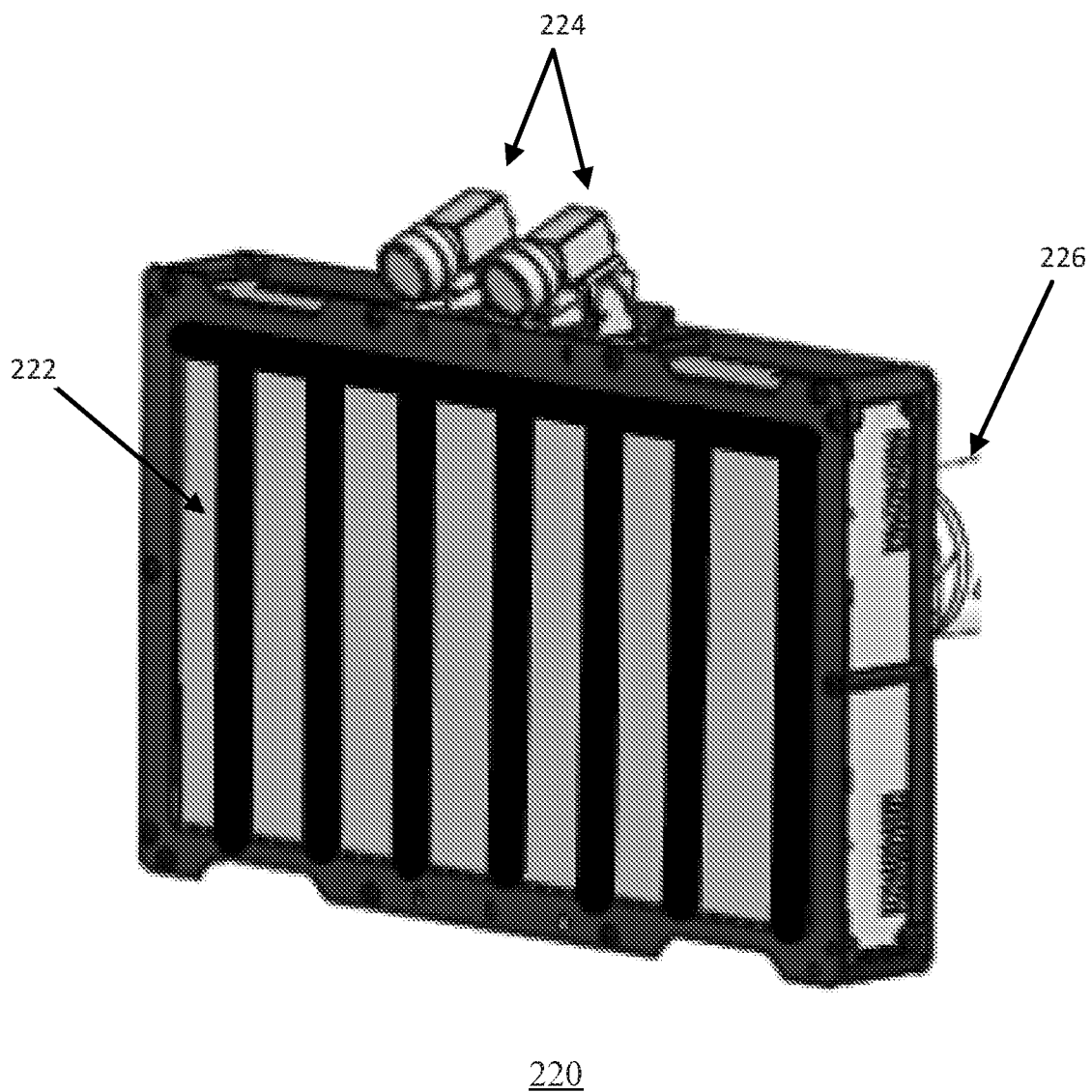

FIG. 2C illustrates a model of an acquisition device 220 according to one or more embodiments of the present disclosure. The acquisition device 220 may include the pattern projection device 114, the image capturing device 118, and/or additional devices (e.g., a pattern generation processor/memory that is used to generate the patterns and/or capture the images). For instance, the acquisition device 220 shown in FIG. 2C includes a liquid crystal display (LCD) screen 222 where patterns may be displayed. As shown, the pattern displayed on the screen 222 is a vertical pattern. These patterns are then reflected onto the surface (e.g., the surface of the object 116) to be inspected for paint defects. The acquisition device 220 further includes two cameras 224 that may be used to capture the reflected patterns at different angles. The acquisition device 220 may be connected to a robot arm 226, which moves around to inspect different parts of the surface of the object 116. In other words, the robot arm 226 may be maneuvered to different positions so as to capture images of different regions or portions of the object 116 and determine whether the different regions of the object 116 have paint defects.

Returning back to FIG. 1, the control system 110 inputs the captured images into the stored ML/AI dataset 112 to determine whether the object 116 has one or more paint defects (e.g., defect 214). Then, the control system 110 causes display of the images including the images with the paint defects. For instance, using the ML/AI dataset 112, the control system 110 may identify that the object 116 has a paint defect and identify a location of the paint defect within the image as well as a location of the paint defect on the object 116. Then, the control system 110 may provide a notification indicating the object 116 has a paint defect. For instance, the control system 110 may use the display device 122 to display the captured image with paint defect.

In some instances, the control system 110 may provide one or more instructions to the pattern projection device 114 to project patterns using different pattern characteristics. For instance, the control system 110 may receive user input indicating one or more pattern characteristics (e.g., a particular frequency for the pattern). The control system 110 may provide instructions indicating for the pattern projection device 114 to project the patterns based on the user input. Additionally, and/or alternatively, the control system 110 may provide instructions to the image capturing device 118 to capture images of the projected pattern on the object 116.

It will be appreciated that the exemplary environment depicted in FIG. 1 is merely an example, and that the principles discussed herein may also be applicable to other situations—for example, including other types of institutions, organizations, devices, systems, and network configurations.

Figure 3:
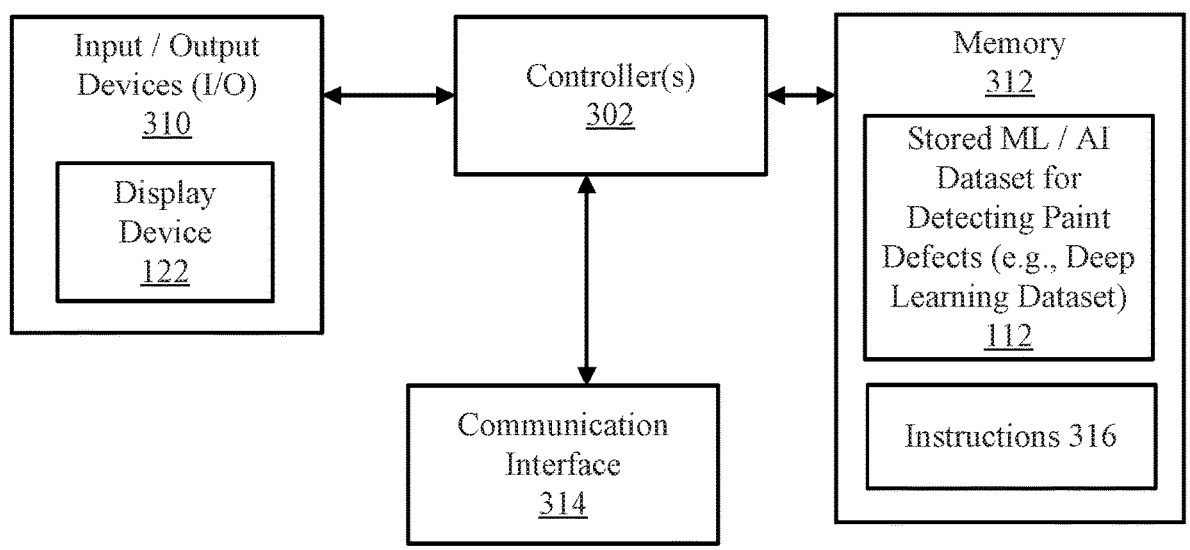
FIG. 3 is a schematic illustration of an exemplary control system according to one or more embodiments of the present disclosure.

FIG. 3 is a schematic illustration of an exemplary control system 110 according to one or more embodiments of the present disclosure. It will be appreciated that the control system shown in FIG. 3 is merely an example and additional/alternative embodiments of the control system 110 from environment 100 are contemplated within the scope of the present disclosure.

The control system 110 includes a controller 302. The controller 302 is not constrained to any particular hardware, and the controller's configuration may be implemented by any kind of programming (e.g., embedded Linux) or hardware design—or a combination of both. For instance, the controller 302 may be formed by a single processor, such as general purpose processor with the corresponding software implementing the described control operations. On the other hand, the controller 302 may be implemented by a specialized hardware, such as an ASIC (Application-Specific Integrated Circuit), an FPGA (Field-Programmable Gate Array), a DSP (Digital Signal Processor), or the like.

The controller 302 is in electrical communication with memory 312. The memory 312 may be and/or include a computer-usable or computer-readable medium such as, but not limited to, an electronic, magnetic, optical, electromagnetic, infrared, or semiconductor computer-readable medium. More specific examples (e.g., a non-exhaustive list) of the computer-readable medium may include the following: an electrical connection having one or more wires; a tangible medium such as a portable computer diskette, a hard disk, a time-dependent access memory (RAM), a ROM, an erasable programmable read-only memory (EPROM or Flash memory), a compact disc read-only memory (CD ROM), or other tangible optical or magnetic storage device. The memory 312 may store corresponding software such as computer-readable instructions 316 (code, script, etc.). The computer instructions 316 being such that, when executed by the controller 302, cause the controller 302 to control the control system 110 to detect paint defects on objects as described herein. The memory 312 may further include the stored ML/AI dataset 112 that is used to detect whether an object has one or more paint defects.

The control system 110 may include input/output (I/O) devices 310 for receiving and/or providing various input and output. For example, the control system 110, via the I/O device 310, may receive external communications from a user and send external communications to the user. The I/O device 310 may further include a display device 122. The display device 122 may display captured images of the object 116. Furthermore, the I/O device 310 may include a user feedback interface that may be used to provide and/or receive information from the user. For example, the user may provide feedback such as particular pattern characteristics for the projected patterns using the user feedback interface.

The controller 302 may communicate with other devices within the environment 100 using the communication interface 314. For example, the controller 302 may receive the trained ML/AI dataset 112 from the enterprise computing system 104 and store this dataset 112 into memory 312. Furthermore, the communication interface 314 may be used to communicate with the pattern projection device 114 and/or the image capturing device 118. For example, the controller 302 may receive the captured images of the object 116 via the communication interface 314.

In other words, in some instances, the image capturing device 118 and/or the pattern projection device 114 may be in wireless communication, including via the network 106, with the control system 110 and/or the controller 302. In other instances, however, the image capturing device 118 and/or the pattern projection device 114 may be directly connected (e.g., via a wired connection) to the control system 110 and/or the controller 302. As such, the controller 302 might not require the communication interface 314 to communicate with the image capturing device 118 and/or the pattern projection device 114.

In some examples, the image capturing device 118 and/or the pattern projection device 114 may be included within the control system 110. However, as shown in FIG. 1 and described above, they may also be separate from the control system 110.

Figure 4:
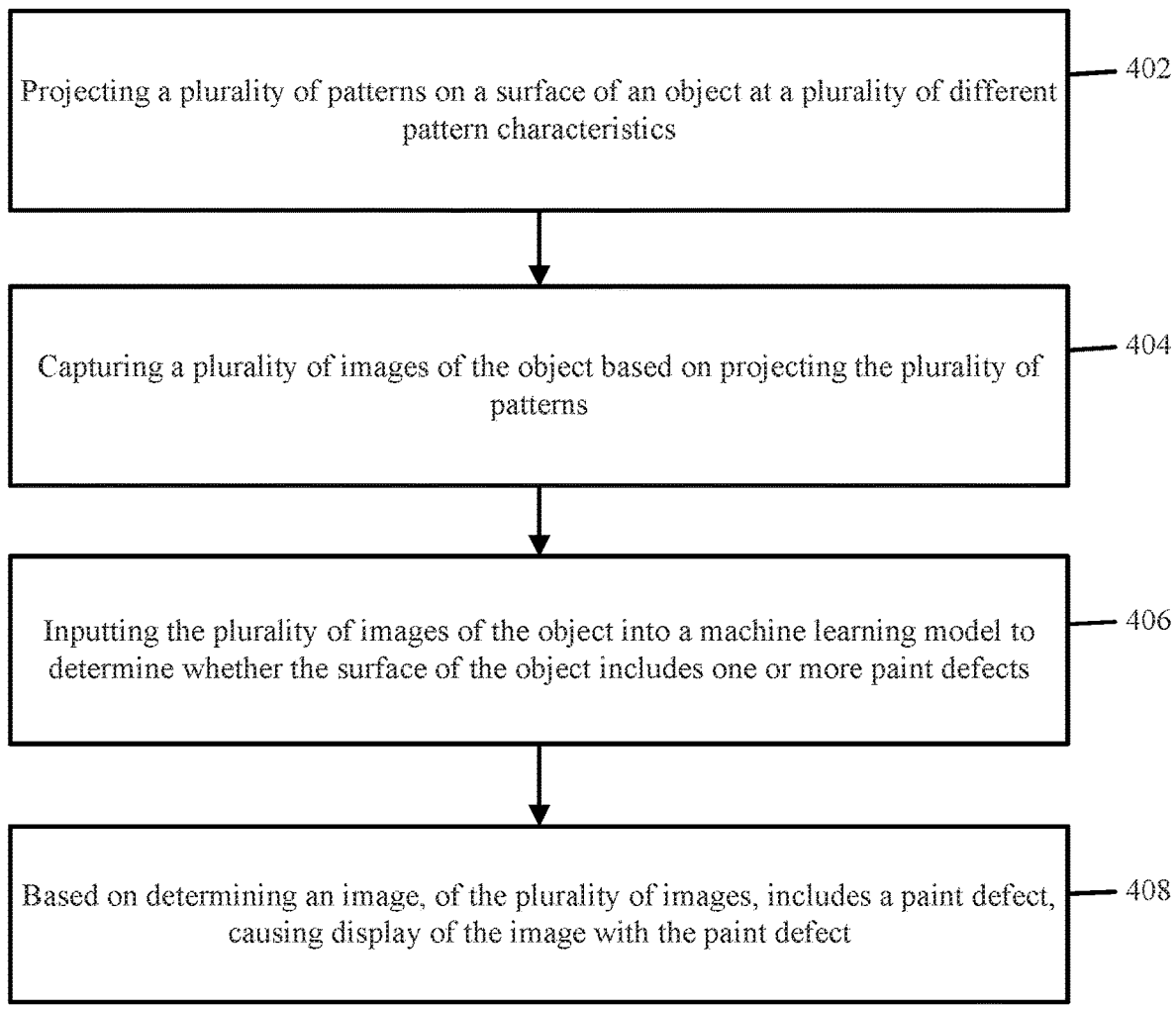
FIG. 4 illustrates a process for using machine learning to detect paint defects according to one or more embodiments of the present disclosure.

FIG. 4 illustrates a process 400 for using machine learning to detect paint defects according to one or more embodiments of the present disclosure. The process 400 may be performed by the paint defect detection system 102, the control system 110, and/or the controller 302 shown in FIG. 3. However, it will be recognized that any of the following blocks may be performed in any suitable order and that the process 400 may be performed in any suitable environment and by any suitable controller or processor.

At block 402, the paint defect detection system 102 (e.g., the pattern projection device 114) projects a plurality of patterns on a surface of an object (e.g., object 116) at a plurality of different pattern characteristics. For instance, after paint has been applied to the object 116 (e.g., the vehicle), the paint defect detection system 102 may determine whether there are one or more paint defects (e.g., scratch and/or particle defects) on the surface of the object 116. To do this, the pattern projection device 114 may project multiple different patterns with different pattern characteristics (e.g., patterns 502-508 with different frequencies and/or vertical/horizontal patterns) onto the object 116.

In some instances, the control system 110 may provide instructions to the pattern projection device 114 such that the pattern projection device 114 projects the patterns onto the object 116. Additionally, and/or alternatively, the patterns projected on the object 116 may be pre-set and/or user-defined. For example, in some variations, the control system 110 may receive user input indicating particular patterns to project on the object 116 (e.g., user input indicating the patterns should be multiple vertical patterns at various different frequencies) and provide instructions indicating the user input to the pattern projection device 114. The pattern projection device 114 may project the patterns (e.g., fringe patterns) onto the object 116.

At block 404, the paint defect detection system 102 (e.g., the image capturing device 118) captures a plurality of images of the object 116 based on projecting the plurality of patterns. For example, the image capturing device 118 may capture images of the projected patterns on the surface of the object 116. The captured images may be used to determine whether the object 116 has a paint defect.

In some instances, the control system 110 may provide instructions to the image capturing device 118 so that the image capturing device 118 captures the images of the projected pattern on the object 116. For instance, the instructions may indicate for the image capturing device 118 to capture a number of images (e.g., one image or multiple images) for each of the projected patterns.

At block 406, the paint defect detection system 102 (e.g., the control system 110 and/or the controller 302) inputs the plurality of images of the object 116 into a machine learning dataset to determine whether the surface of the object 116 includes one or more paint defects. For instance, after receiving the captured images from the image capturing device 118, the controller 302 may retrieve the stored ML/AI dataset 112 from memory 312. Then, the controller 302 may input the captured images into the ML/AI dataset 112 to generate and/or determine whether the object 116 includes a paint defect. For example, the output of the ML/AI dataset 112 may be and/or include an indication of the paint defect on the object 116. The indication may include a location of the paint defect on the object 116 and/or on the captured image. In some instances, the indication may also indicate an accuracy or confidence value associated with the paint defect (e.g., the likelihood that the paint defect detected by the ML/AI dataset 112 is actually a paint defect). FIGS. 6A-6L will describe this in more detail.

Figure 6A:
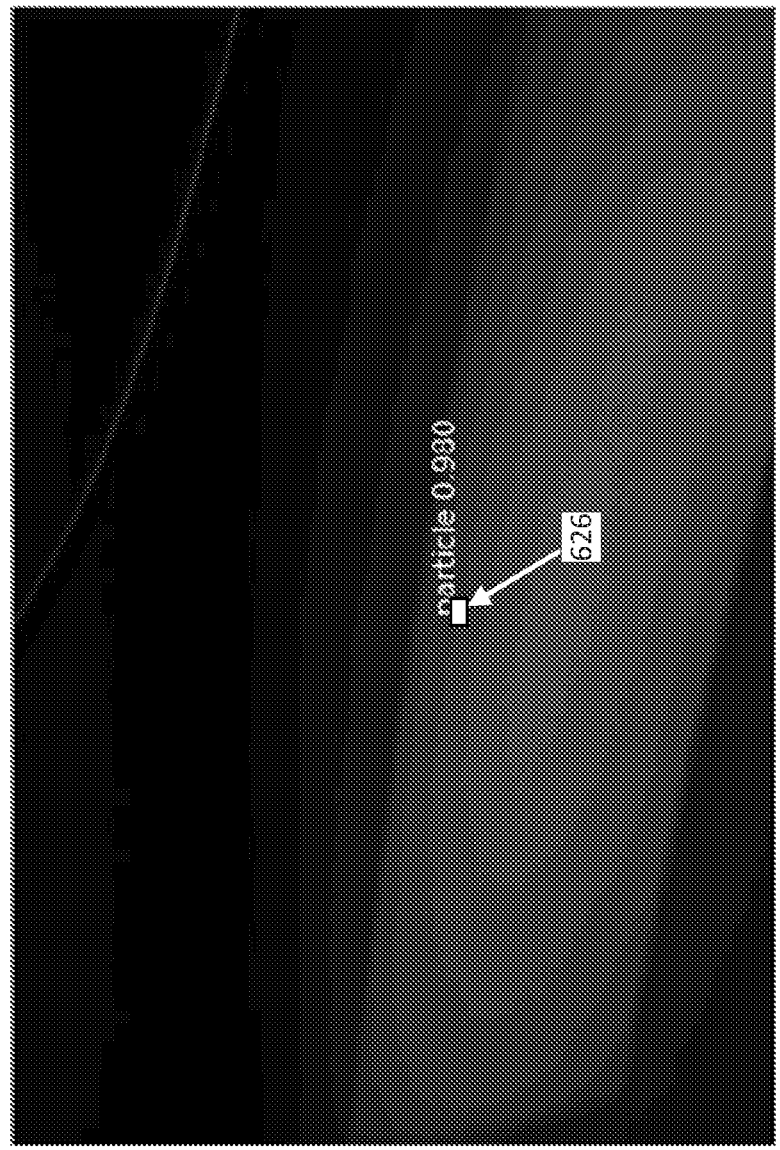
Figure 6B:
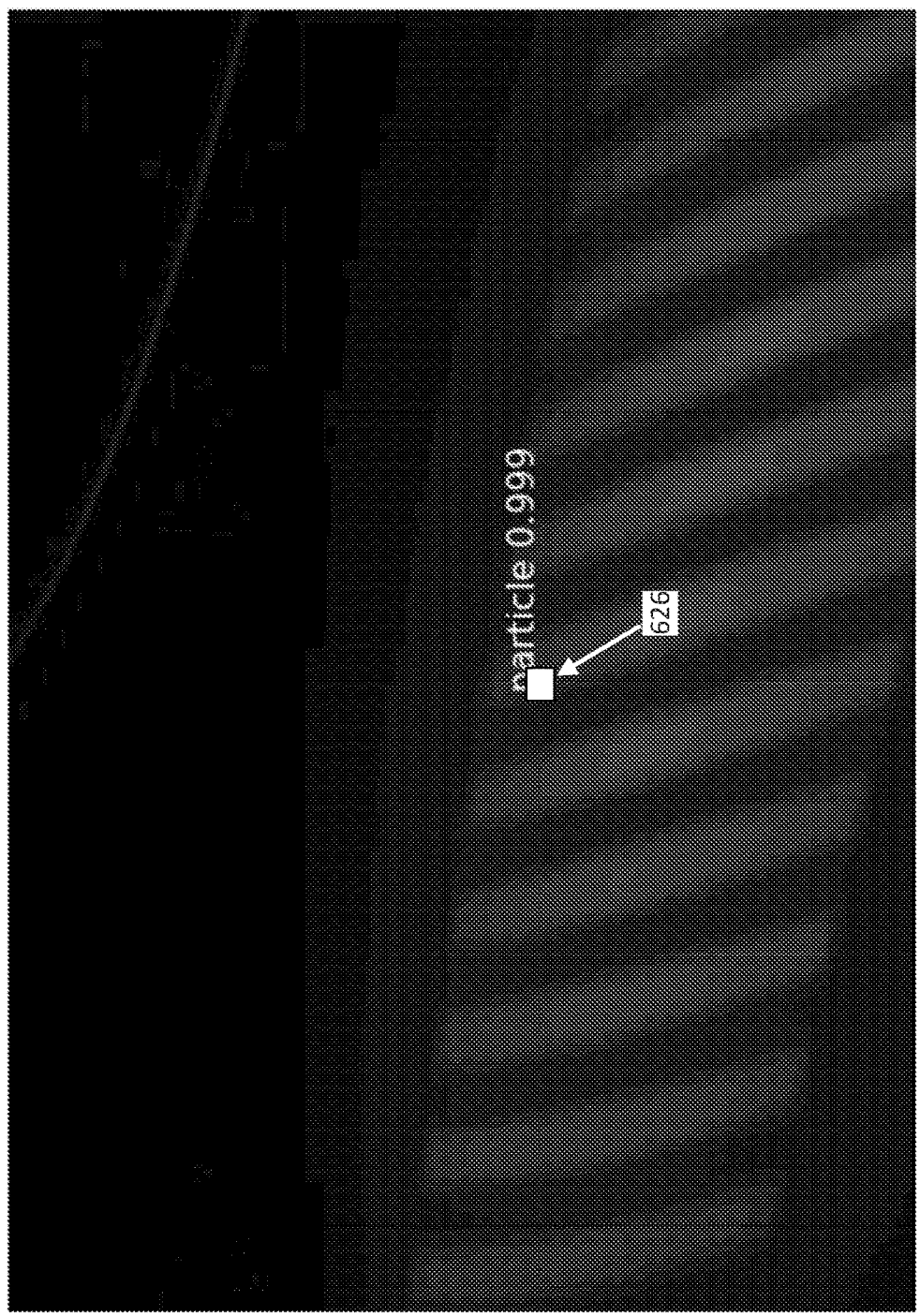
Figure 6C:
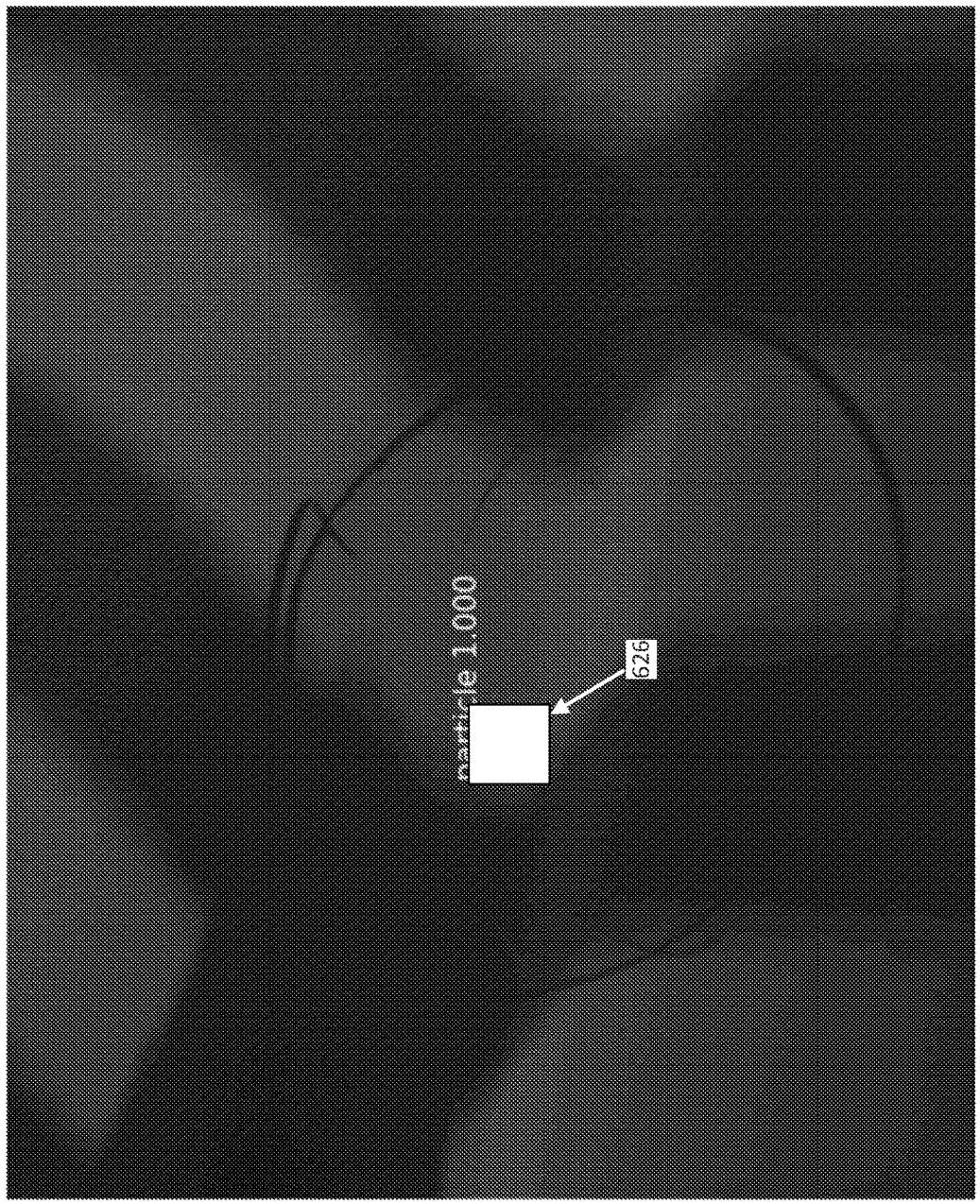
Figure 6E:
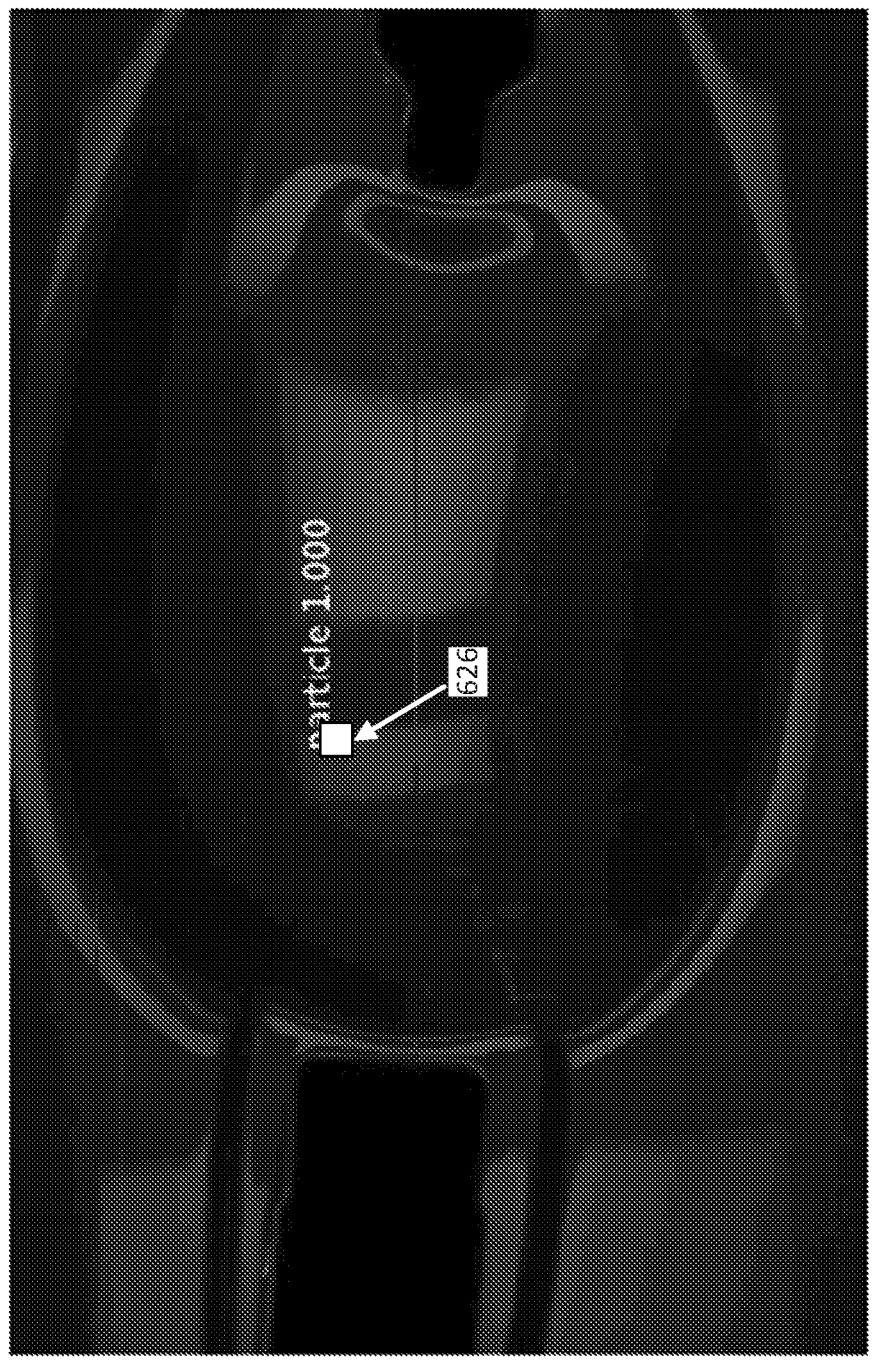
Figure 6F:
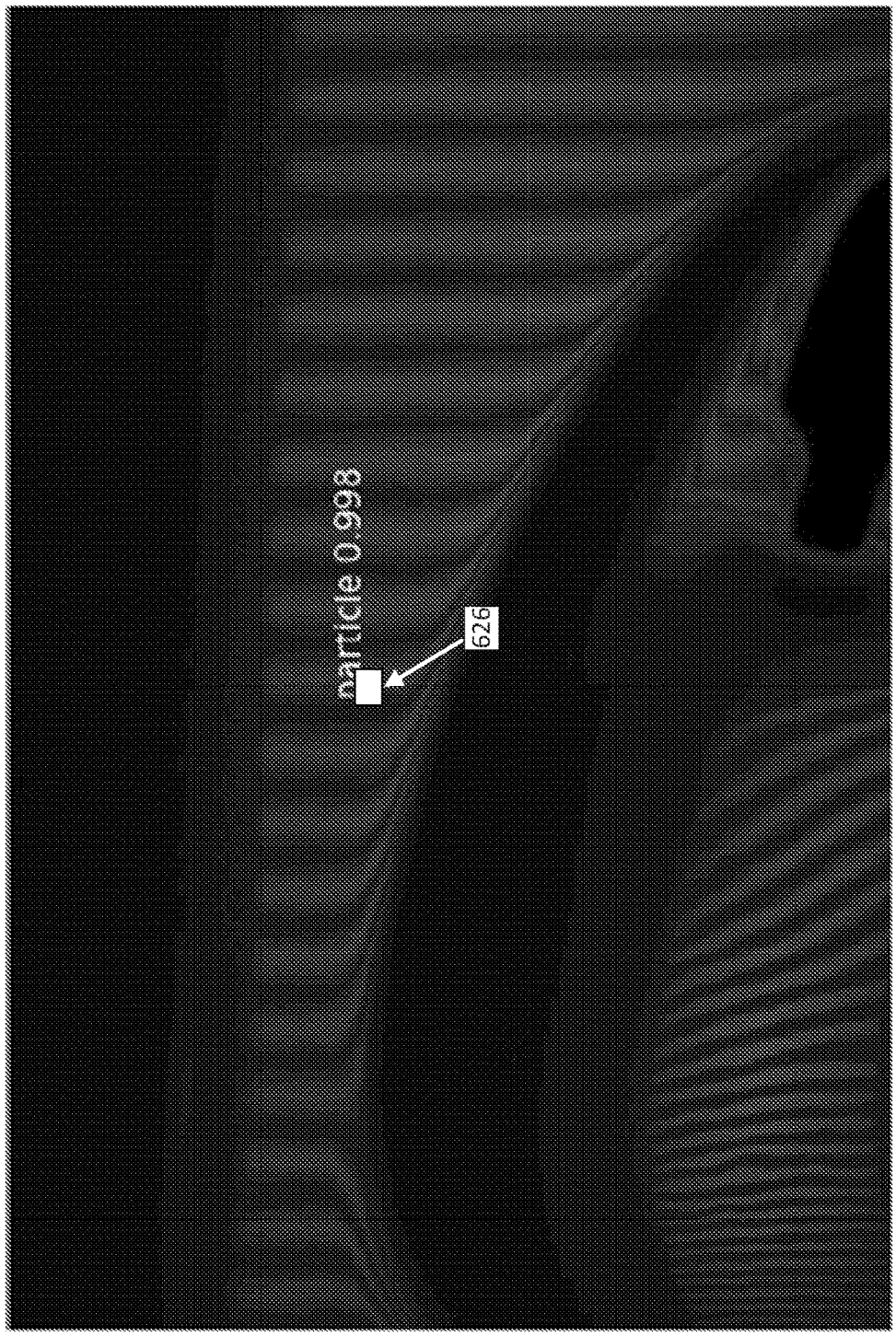
Figure 6G:
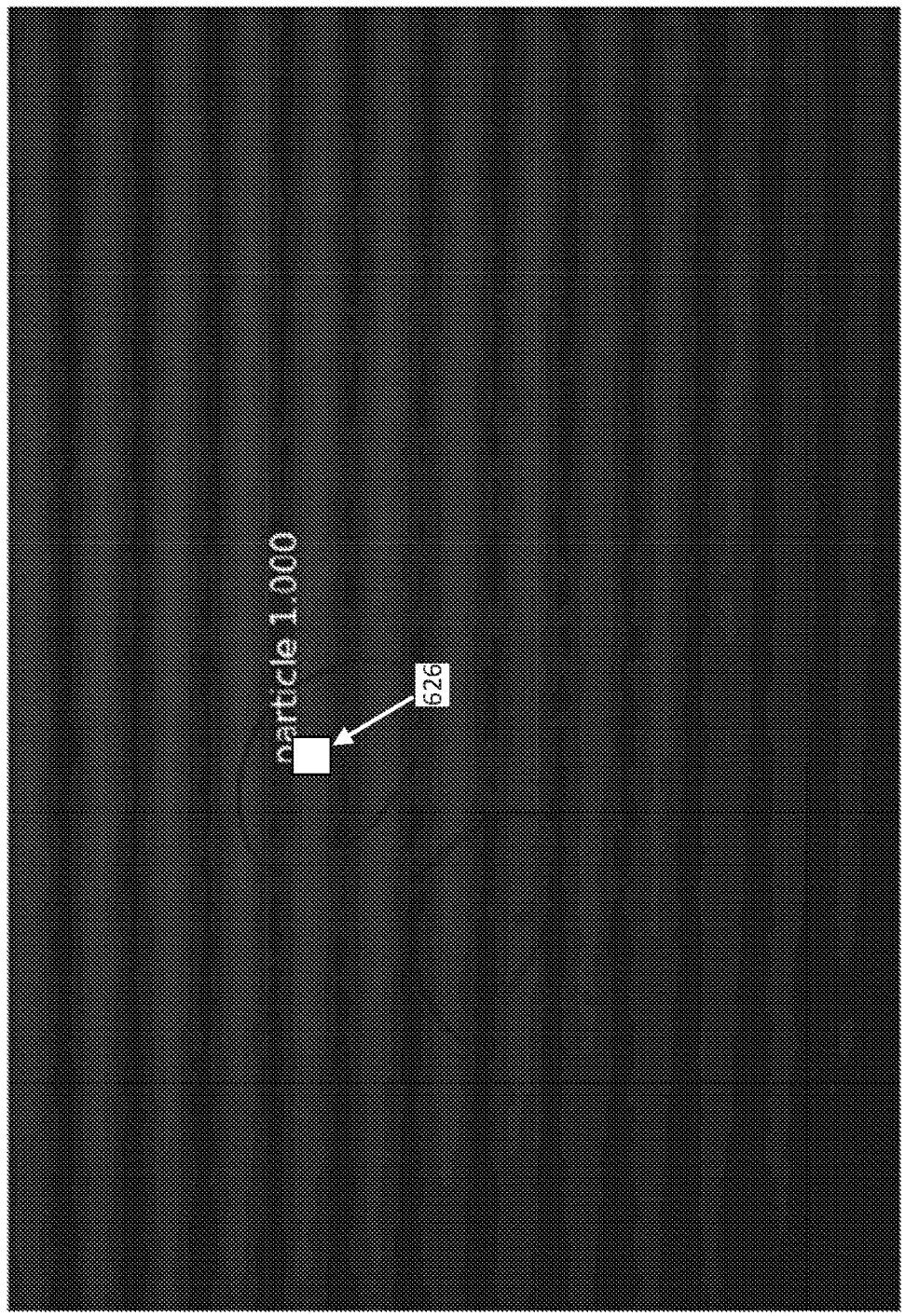
Figure 6H:
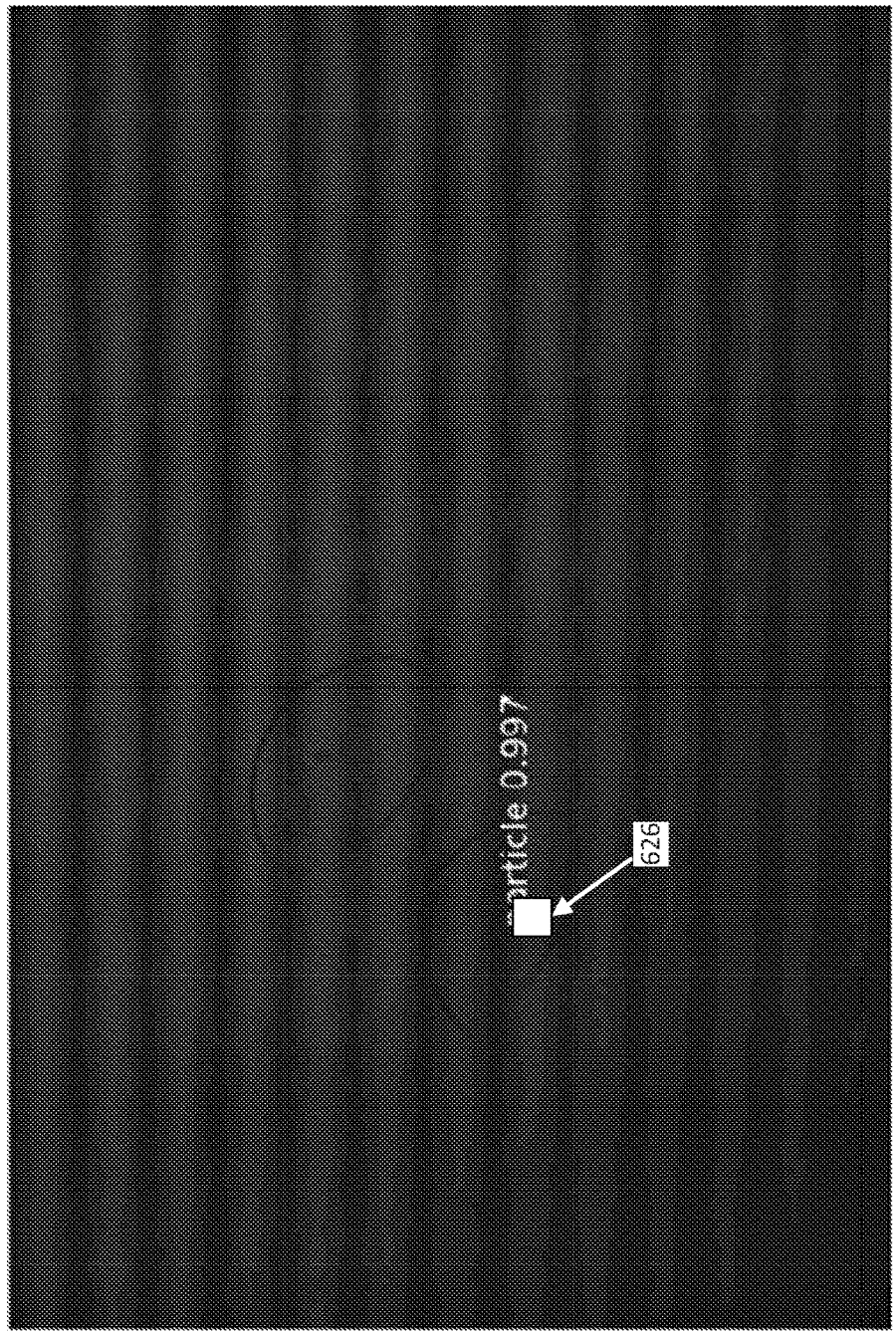
Figure 6I:
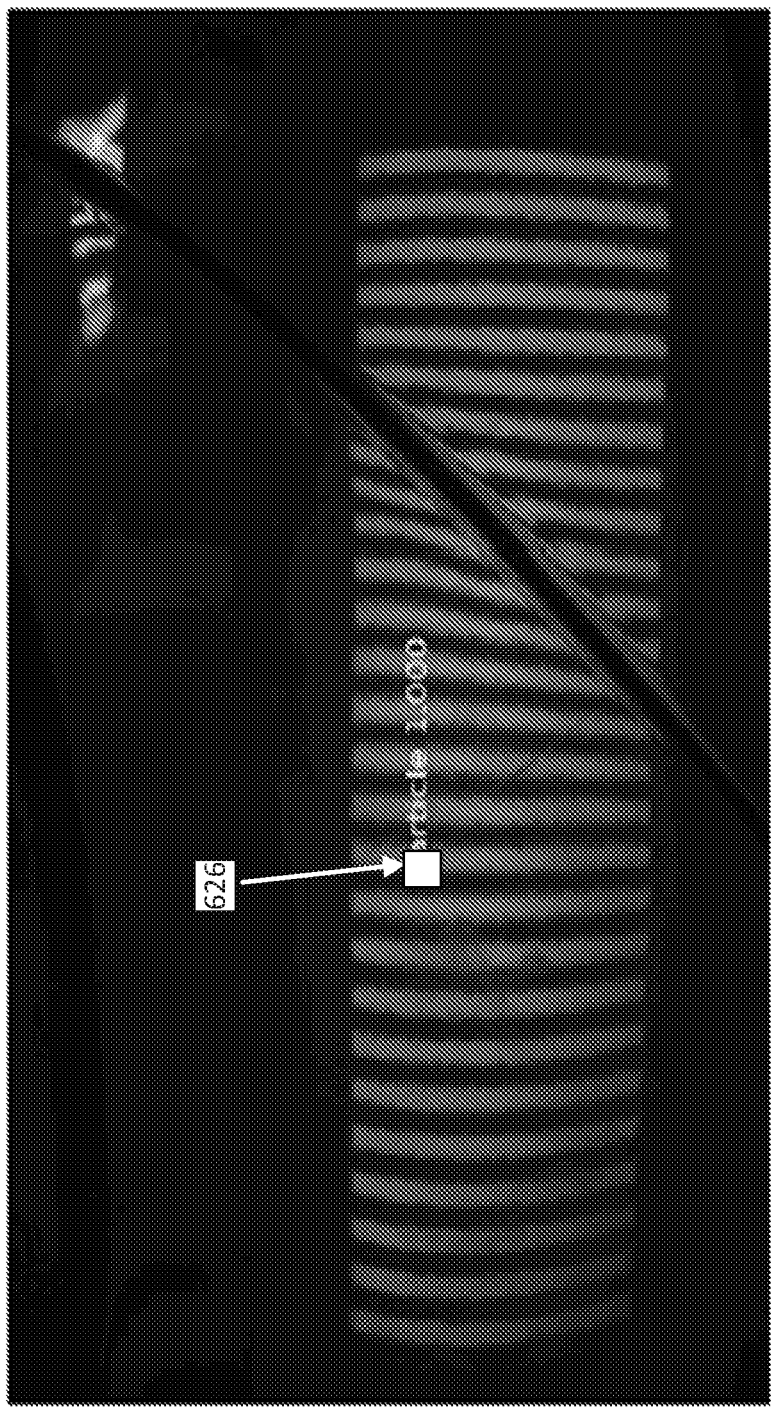
Figure 6J:
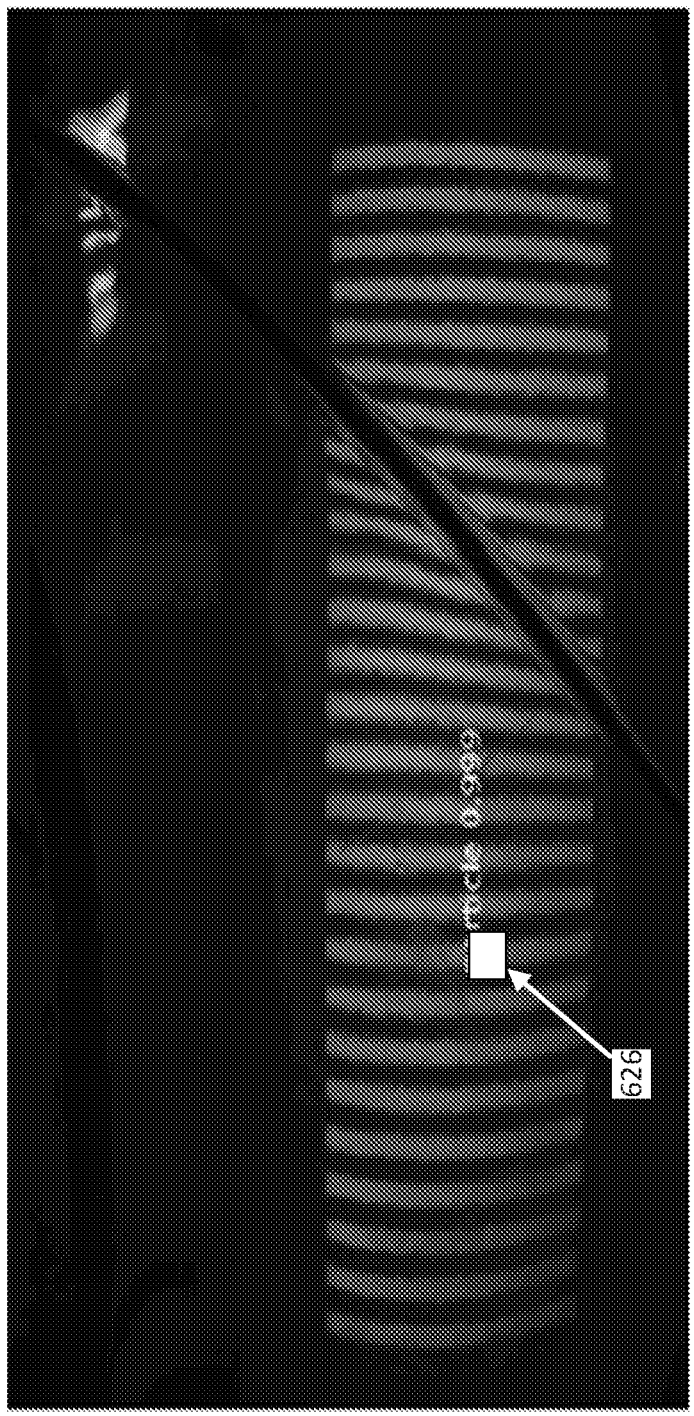
Figure 6K:
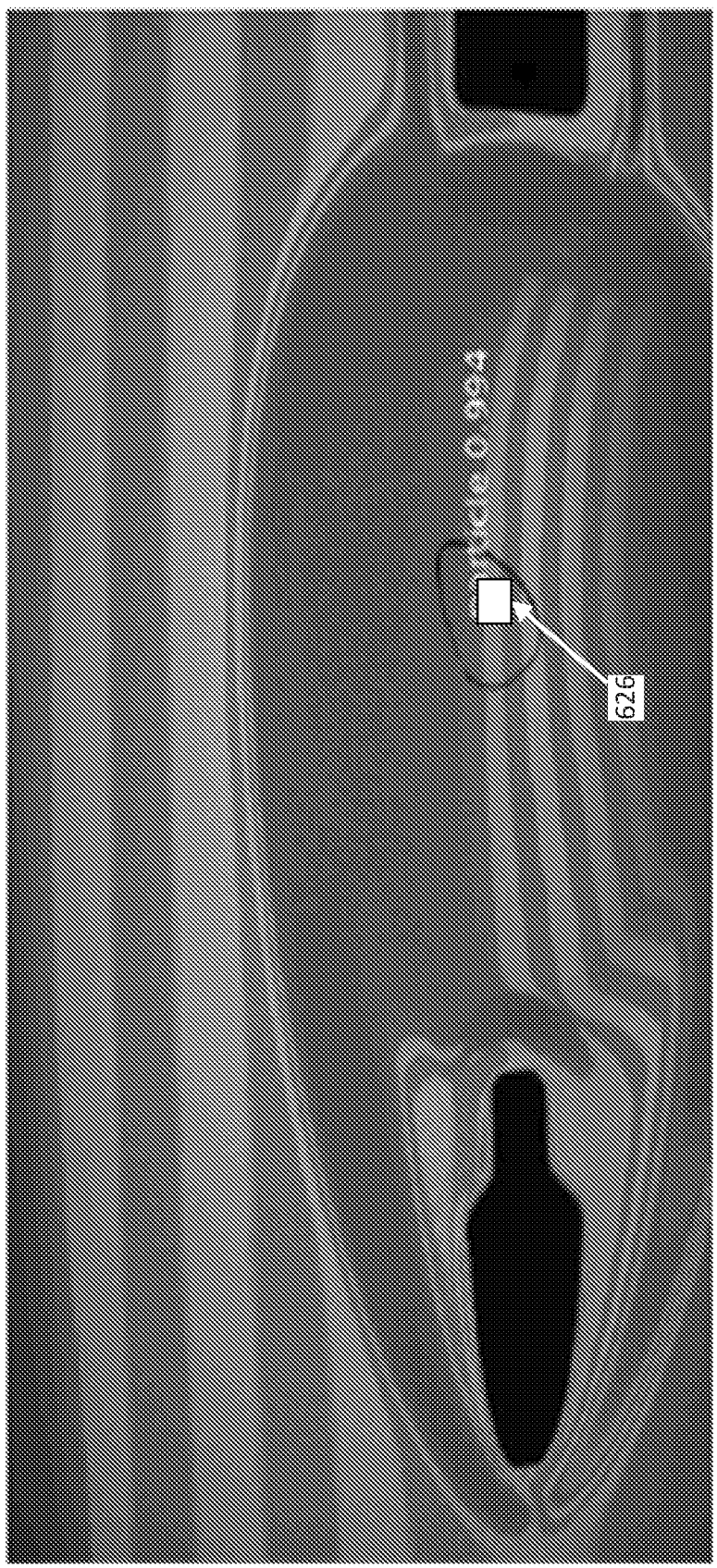
Figure 6L:
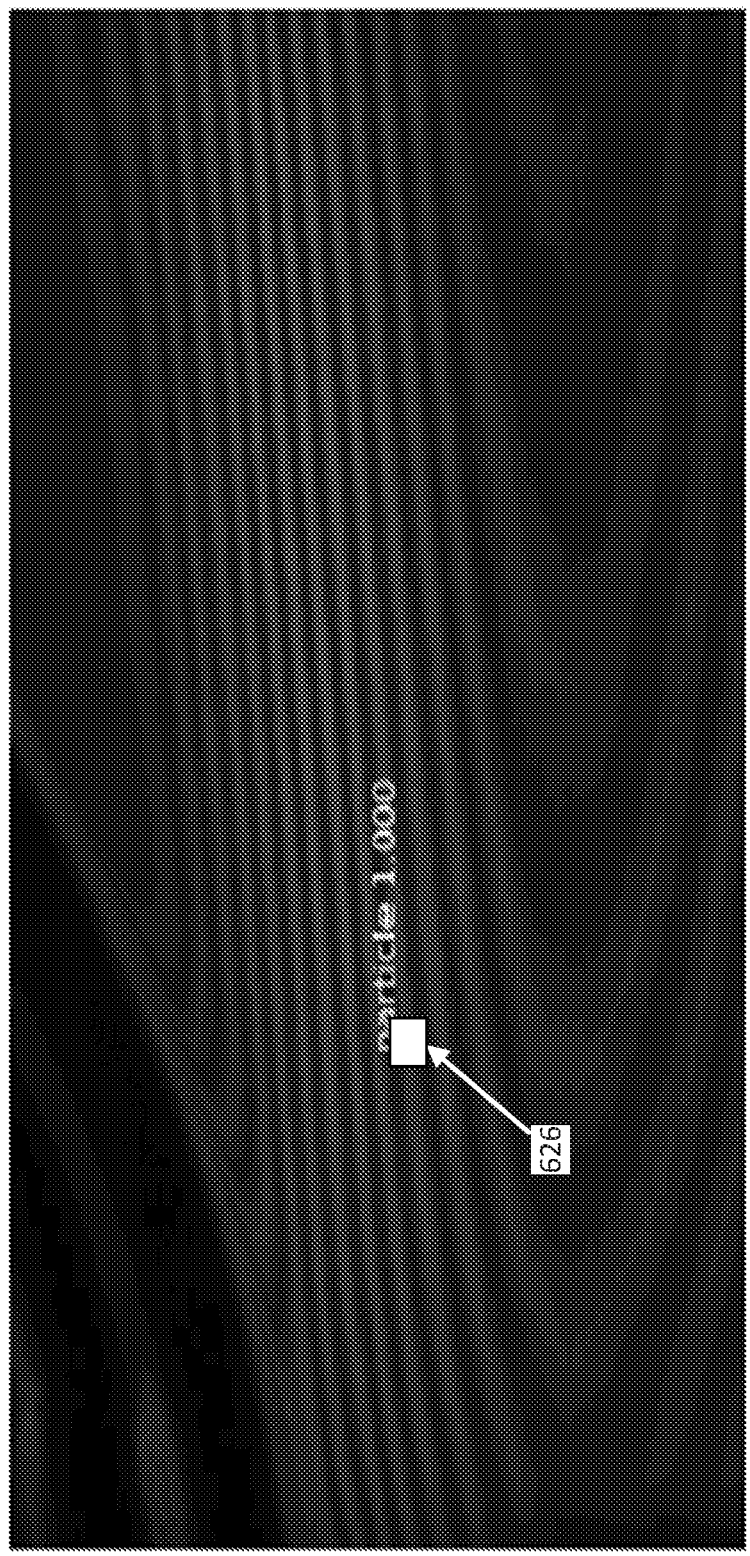

FIGS. 6A-6L depict exemplary captured images 602-624 with paint defects detected using machine learning according to one or more embodiments of the present disclosure. For example, each of the images 602-624 may be captured by the image capturing device 118 after a pattern 120 has been projected by the pattern projection device 114. Each of these images 602-624 also includes a paint defect as denoted by the white box and reference number 626. These images also show the text "particle" and a number. The number refers to a confidence value or probability value associated with the detected paint defect 626. For instance, FIG. 6F shows a pattern (similar to pattern 502 from FIG. 5A) projected onto an object. The distortion in this pattern may be caused by the contours/edges of the object 116. For instance, the object 116 may be a vehicle and the captured image may be of the vehicle door. The frame of this door may cause distortions shown within the pattern. Additionally, FIG. 6F shows a paint defect 626 within the image and it also shows the location of the paint defect 626. Next to the paint defect 626 is the text "particle" with a number "1.000". The number "1.000" indicates the probability value that the detected paint defect 626 is actually a paint defect (e.g., a determined 100% probability by the controller 302 that paint defect 626 is actually a paint defect). In FIG. 6B, the number is "0.999", which indicates the probably value of the paint defect 626 detected in FIG. 6B is actually a paint defect is 99.9%. Furthermore, the controller 302 may use the ML/AI dataset 112 and/or localization to determine a location of the actual object where the paint defect 626 is located based on the location of the paint defect 626 within the image. In other words, the controller 302 may use the ML/AI dataset 112 to determine whether there is a paint defect (e.g., defect 626) within the image, a probability that the detect defect is actually a defect, and a location of the paint defect within the image as well as on the object 116 itself.

The ML/AI dataset 112 that is used by the paint defect detection system 102 to detect the paint defect can be any type of object detection ML or AI dataset (e.g., ML/AI algorithm and/or model) such as a supervised learning dataset, an unsupervised learning dataset, and/or a deep learning dataset. For example, in some variations, the ML/AI dataset 112 may be a deep learning dataset (e.g., one or more neural networks) that includes a plurality of layers with each of the layers including a plurality of nodes that loosely model the neurons in a biological brain. Each of the nodes are connected to the nodes in the subsequent layer via connectors such as edges. The edges typically are associated with a weight that indicates the strength of the connection or the likelihood the node transitions to the new node. For example, in a simple neural network that may be used, the first layer (e.g., a bottom layer) includes three nodes. Each of these nodes have five edges and each of these edges connects the node from the first layer to a different node of the second layer (e.g., the second from the bottom layer). Each of these five edges is associated with a weighted value indicating the strength of connection between the node from the first layer to a node from the second layer. The ML/AI dataset 112 may include/be the simple neural network as described above or it may be a more complex neural network including a dataset 112 that comprises multiple different linked neural networks. Using an exemplary ML/AI dataset 112 with multiple neural networks (e.g., Mask Region-based Convolutional Neural Networks) to detect paint defects is described below.

Initially, the ML/AI dataset 112 may be a generic object detection ML/AI dataset (e.g., a dataset with generic and/or untrained weighted values). The paint defect ML/AI training system 108 of the enterprise computing system 104 may train the generic object ML/AI dataset using training data. For instance, the training data may include images that include paint defects. In some instances, these images may be of vehicles with paint defects. The training system 108 may feed the training data (e.g., images) into the ML/AI dataset and adjust the weighted values accordingly based on whether the ML/AI dataset accurately determines if the images have a paint defect and/or accurately determines the location of the paint defect within the image or on the object. In some examples, the training system 108 may use one or more loss functions to train the ML/AI dataset. After completion of the training (e.g., based on the ML/AI dataset reaching an accuracy threshold), the enterprise network 104 may provide the trained ML/AI dataset 112 to the paint defect detection system 102 via the network. Then, as explained above, the paint defect detection system 102 may use the trained ML/AI dataset 112 to detect whether the object 116 has one or more paint defects.

In some instances, the training system 108 may use transferred learning to train the ML/AI dataset 112. In some examples, the paint defect detection system 102 may perform some or all of the training of the ML/AI dataset 112. For instance, the enterprise computing system 104 may transfer a generic ML/AI dataset to the paint defect detection system 102 and the paint defect detection system 102 may train the ML/AI dataset using training data. In some variations, the enterprise computing system 104 trains the ML/AI dataset and sends the trained ML/AI dataset to the paint defect detection system 102. The paint defect detection system 102 may continuously train and update the received ML/AI dataset using newly captured images from the image capturing device 118. In other words, even after the ML/AI dataset has been trained by the training system 108, the paint defect detection system 102 may still continuously train and update the ML/AI dataset 112 (e.g., update the weights of the ML/AI dataset 112) using newly captured images.

At block 408, the paint defect detection system 102 (e.g., the controller 302) causes display of the image with the paint defect based on determining an image, of the plurality of images, includes a paint defect. For example, after determining one or more captured images of the object 116 has a paint defect, the controller 302 causes display of the image(s) on the display device 122 and/or another display device. The displayed images may be similar to images 602-624 from FIGS. 6A-6L. For instance, the displayed images may include an identified paint defect (e.g., defect 626).

Below describes an exemplary implementation of process 400, including block 406, and the ML/AI dataset 112, including specific examples of ML/AI datasets 112 that are used to detect paint defects, in more detail. In particular, the existing solutions for defect detection typically employ tuned solutions, such as extracting pre-defined features from the image and following a template matching process, for the specific application under consideration. This, however, might not be necessary when considering using machine learning algorithms for vision systems, particularly for object detection and segmentation problems. Among others, the ML/AI dataset 112 may be and/or include Faster Region-based Convolutional Neural Networks (Faster-RCNN), Mask Region-based Convolutional Neural Networks (Mask-RCNN), You Only Look Once (YOLO) network, and Single Shot Detector (SSD) network. The Mask-RCNN will be described in further detail below as a particular ML/AI dataset 112 that is used to detect paint defects. However, it is emphasized that due to the capability of using pre-trained networks on large datasets and hence, availability of a rich learned set of features, the training of these networks for custom defect detection problems does not require a significant amount of samples for achieving a reasonable amount of accuracy.

An automated paint defect inspection solution may be required to achieve very high accuracy in detecting the defects (e.g., 99% or more), and consequently, deep learning based paint defect detection/segmentation algorithms may be used whose performance in standard benchmarks are comparable and better, among others.

In order to prove a turn-key solution that may be integrated into manufacturing lines (e.g., vehicle manufacturing/production lines), it may be required to provide manipulators and controllers, cameras and lighting apparatus, and also software for performing the defect inspection. Other than the manipulator and controller, some challenges for an effective image acquisition (cameras, lightening, zooming, and similar) and the performance of a machine learning algorithm is highly correlated, which is described above (e.g., to solve this, the paint defect detection system 102 may project multiple patterns onto the object 116). In some instances, in the case of insufficient illumination or complex background, both the traditional visual detection methods, which relies heavily on the light source, as well as machine learning based models may suffer from detection accuracy.

Regarding using Mask-RCNN algorithm, this network may be a generalization of Faster-RCNN where in addition to high-accuracy detection, it also provides segmentation capability (e.g., generates mask for identified paint defects). As with other RCNN (regional convolution neural network) based paint defect detection algorithm, Mask-RCNN may include two steps. In the first step, several proposals/determinations are generated which are the areas that are likely to contain a paint defect, and this follows with the classification, masks, and bounding masks generation.

The Mask-RCNN network consists of several layers, where the fundamental low-level feature extraction region is based upon the residual neural network (ResNet) architectures. The feature extraction layer may be thought of learning a set of successive filters from the training data, which when applied to an image may generate a rich set of information. In other words, the ResNet architecture is used by the controller 302 in order to extract a plurality of features (e.g., edges from the surface of the object, defects, and/or other identifiable features from the images) from the plurality of captured images.

The feature extraction layer is further improved by a layer referred to as the Feature Pyramid Network (FPN). The candidate region of interests is next determined by a layer called the Region Proposal Network (RPN), which essentially scans the image for potential areas that contain paint defects. These areas are called anchors whose sizes are set during the training and they are generated over the features extracted by the previous step. The essential feature of RPN is that it scans the backbone feature map instead of the original image, which reduces redundant steps.

For every anchor, RPN generates two outputs; an anchor class and bounding box refinement, where the first represents whether there exists a paint defect or not in the box and the second provides a refinement estimate of the position of the paint defect. Since many anchors are generated, RPN prediction helps to reduce the number of anchors to be considered. This set is called the regions of interest (ROI), which is fed to the next step where it generates two outputs for each ROI: class prediction and another regression for the box. In this step, which runs on the ROI, two further predictions are generated; a class of the feature (e.g., the class may indicate the feature is a paint defect) in the ROI and a box (e.g., four coordinates) used to determine the location of the paint defect.

In other words, the FPN and RPN are used by the controller 302 to determine whether any of the identified features from the output of the ResNet architecture are paint defects. Further, by using the FPN and RPN, the controller 302 is able to output a position or location identifier (e.g., a box with four coordinates) of the paint defect.

Once the class and the location of the paint defect are determined, the final step is the segmentation mask, which is simply an additional convolutional neural network acting on the regions selected by the ROI classifier. The network generates masks for each paint defect in the ROI. In other words, the controller 302 uses the segmentation mask to determine a pixel-wise location of the box/paint defect within the image.

It may become apparent that there exist several parameters in the above algorithm ranging from anchor scales and input image dimension to more subtle parameters of the network (such as layer sizes) and optimization algorithm which are selected in advance.

Segmentation task includes predicting the class value, regressing a box around the object and finally, fitting a pixel-wise mask around the object. Consequently, the loss function ($L_{lot}$) to be minimized is a multi-task loss defined as:

$$L_{lot} = L_{cls} + L_{box} + L_{mask}, \tag{1}$$

where the classification and bounding box regression losses simply follows from Faster-RCNN algorithm:

$$L_{cls}(p_i) := \frac{1}{N_{cls}} \sum_i l_{cls}(p_i, p_i^*) \tag{2}$$

$$L_{box}(t_i) := \frac{1}{N_{reg}} \sum_i p_i^* l_{reg}(t_i, t_i^*).$$

In Equation (2), i denotes the index of an anchor in a mini-batch and $p_i$ is the predicted probability of anchor i being a paint defect, $p_i^*$ denotes the ground-truth label where it takes value of 1 if the anchor is positive (contains paint defect) and 0 otherwise. The classification loss ($l_{cls}$) is defined as binary cross-entropy loss over two classes (paint defect versus not paint defect) whereas the regression loss is defined as $l_{reg} := R(t_i - t_i^*)$ where R is the robust loss function. In this function, $t_i$ is a vector representing the 4 parametrized coordinates of the predicted bounding box and $t_i^*$ is the ground truth associated with a positive anchor. The classification and regression losses are normalized by two parameters $N_{cls}$ and $N_{reg}$ and the final cost is weighted by a balancing parameter $\lambda$. These parameters depend on the size of the mini-batch, number of anchors and their ratios. Finally, in order to define the mask loss $L_{mask}$, first note that for each RoI, the mask branch of Mask-RCNN has a $k_m^2$ dimensional output, where k is the number of classes and m is the resolution of binary masks (m×m). To this output, sigmoid function ($f(x)=1/(1+e^{-x})$) is applied pixel-wise. The final cost for $L_{mask}$ is then defined as the average binary cross-entropy loss. Finally, for an RoI associated with ground-truth class k, $L_{mask}$ is defined on the k-th mask (other mask outputs do not contribute to the loss).

The most typical performance metric for object detection algorithms is the so-called mean average precision (mAP) with different Intersection over Union (IoU) thresholds. IoU measures the overlap between two bounding boxes which in this context refers to measuring the overlap between the ground truth bounding box and the predicted bounding box. Let $B_g$ and $B_p$ be such two boxes. The IoU measure can be computed by $$\frac{\text{area}(B_g \cap B_p)}{B_g \cup B_p}.$$

With the IOU, it is possible to tell if a detection is true positive (TP) or false positive (FP). More explicitly, a TP can be defined by IoU≥threshold and an FP otherwise where the threshold is set depending on the metric. The mAP metric is finally computed by considering the area under the precision-recall graph.

As it is mentioned above, the fundamental problem for the automated defect detection is the availability of decent quality of images under varying environmental conditions. Indeed, the performance of the above algorithm on defect classification can be dependent on the quality of the acquired images. In order to overcome this difficulty, the above mentions to use patterned light sources where the surface to be inspected is analyzed based on the reflected patterns. These patterns may be sinusoidal signals with different frequency and are generated both vertically and horizontally. This is shown in FIGS. 5A and 5B and described above.

Once a number of reflected samples from the scanned surface is accumulated, the paint defect detection algorithm described above analyzes these samples for defect identification. The defects may not be visible in all of these samples (e.g., captured images), but they are likely to be visible in at least a few of them.

As mentioned above, the standard measure for the performance of object detection algorithms is the mAP score. This performance has been focused even more on the detection capability and the minimization of false positives. Some results are as follows: the results presented in FIGS. 6A-6L were obtained by training the ML/AI dataset 112 and was able to achieve a high level of accuracy in the detection of two types of defects (particles and scratches).

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for detecting paint defects on objects, comprising:
    projecting a plurality of patterns on a surface of an object at a plurality of different pattern characteristics, wherein projecting the plurality of patterns comprises:
        projecting, at a first instance in time, a first pattern with a first pattern characteristic on the object; and
        projecting, at a second instance in time, a second pattern with a second pattern characteristic on the object,
        wherein the first pattern characteristic is different from the second pattern characteristic;
    capturing a plurality of images of the object based on projecting the plurality of patterns;
    inputting the plurality of images of the object into a machine learning model to determine whether the surface of the object includes one or more paint defects; and
    based on determining, an image, of the plurality of images, includes a paint defect, causing display of the image with the paint defect.

2. The method of claim 1, wherein capturing the plurality of images comprises:
    capturing, at the first instance in time, one or more first images based on projecting the first pattern;
    capturing, at the second instance in time, one or more second images based on projecting the second pattern, and
    wherein inputting the plurality of images into the machine learning model comprises inputting the one or more first images and the one or more second images into the machine learning model.

3. The method of claim 1, wherein the first pattern is a horizontal pattern and the second pattern is a vertical pattern.

4. The method of claim 1, wherein the first pattern is associated with a first frequency value and the second pattern is associated with a second frequency value that is different from the first frequency value.

5. The method of claim 1, further comprising:
receiving the machine learning model from a back-end server, wherein the back-end server trains the machine learning model based on captured images of paint defects on surfaces of one or more vehicles.

6. The method of claim 1, further comprising:
receiving a generic object detection machine learning model from a back-end server; and
training the generic object detection machine learning model to generate the machine learning model based on captured images of paint defects.

7. The method of claim 1, wherein the machine learning model comprises Mask Region-based Convolutional Neural Networks (Mask-RCNN).

8. The method of claim 1, wherein the machine learning model comprises a residual neural network (ResNet), and wherein inputting the plurality of images of the object into the machine learning model to determine whether the surface of the object includes the one or more paint defects comprises:
inputting the plurality of images into the ResNet to extract a plurality of features from the plurality of images; and
determining whether the plurality of features show the one or more paint defects on the surface of the object.

9. The method of claim 8, wherein the machine learning model further comprises a feature pyramid network (FPN) and a region proposal network (RPN), and wherein determining whether the plurality of features show the one or more paint defects on the surface of the object comprises:
using the FPN and RPN to generate two outputs for the plurality of features, wherein a first output, of the two outputs, indicates whether a feature, from the plurality of features, is a paint defect, and wherein a second output, of the two outputs, is a location identifier for the feature.

10. A system for detecting paint defects on objects, comprising:
a pattern projection device configured to project a plurality of patterns on a surface of an object at a plurality of different pattern characteristics, wherein the pattern projection device is configured to project the plurality of patterns by:
projecting, at a first instance in time, a first pattern with a first pattern characteristic on the object; and
projecting, at a second instance in time, a second pattern with a second pattern characteristic on the object,
wherein the first pattern characteristic is different from the second pattern characteristic;
an image capturing device configured to capture a plurality of images of the object based on projecting the plurality of patterns; and
a control system configured to:
input the plurality of images of the object into a machine learning model to determine whether the surface of the object includes one or more paint defects; and
based on determining, an image, of the plurality of images, includes a paint defect, display the image with the paint defect.

11. The system of claim 10, wherein the image capturing device is configured to capture the plurality of images by:
capturing, at the first instance in time, one or more first images based on projecting the first pattern;
capturing, at the second instance in time, one or more second images based on projecting the second pattern, and
wherein the control system inputs the plurality of images into the machine learning model by inputting the one or more first images and the one or more second images into the machine learning model.

12. The system of claim 10, wherein the first pattern is a horizontal pattern and the second pattern is a vertical pattern.

13. The system of claim 10, wherein the first pattern is associated with a first frequency value and the second pattern is associated with a second frequency value that is different from the first frequency value.

14. The system of claim 10, wherein the control system is further configured to:
receive the machine learning model from a back-end server, wherein the back-end server trains the machine learning model based on captured images of paint defects on surfaces of one or more vehicles.

15. The system of claim 10, wherein the control system is further configured to:
receive a generic object detection machine learning model from a back-end server; and
train the generic object detection machine learning model to generate the machine learning model based on captured images of paint defects.

16. The system of claim 10, wherein the machine learning model comprises Mask Region-based Convolutional Neural Networks (Mask-RCNN).

17. A non-transitory computer-readable medium having processor-executable instructions stored thereon, wherein the processor-executable instructions, when executed by one or more controllers, facilitate:
projecting a plurality of patterns on a surface of an object at a plurality of different pattern characteristics, wherein projecting the plurality of patterns comprises:
projecting, at a first instance in time, a first pattern with a first pattern characteristic on the object; and
projecting, at a second instance in time, a second pattern with a second pattern characteristic on the object,
wherein the first pattern characteristic is different from the second pattern characteristic;
capturing a plurality of images of the object based on projecting the plurality of patterns;
inputting the plurality of images of the object into a machine learning model to determine whether the surface of the object includes one or more paint defects; and
based on determining, an image, of the plurality of images, includes a paint defect, causing display of the image with the paint defect.

* * * * *